United States Patent [19]

Schmidt et al.

[11] Patent Number: 4,747,044

[45] Date of Patent: May 24, 1988

[54] DIRECT EXECUTION OF SOFTWARE ON MICROPROGRAMMABLE HARDWARE

[75] Inventors: Carson T. Schmidt, Poway; Chenyu Chao, San Diego; Gregory D. Brinson, Escondido; Jerrold L. Allen; Barry L. Loges, both of San Diego; Timothy G. Goldsbury, Excondito; Robert O. Gunderson, Poway; Jerry K. Herreweyers, San Diego, all of Calif.

[73] Assignee: NCR Corporation, Dayton, Ohio

[21] Appl. No.: 643,512

[22] Filed: Aug. 23, 1984

[51] Int. Cl.[4] .............................................. G06F 13/08
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,085,448 | 4/1978 | Kogge | 364/200 |
| 4,144,562 | 3/1979 | Cooper | 364/200 |
| 4,322,815 | 3/1982 | Broughton | 364/900 |
| 4,332,010 | 5/1982 | Messina et al. | 364/200 |
| 4,400,774 | 8/1983 | Toy | 364/200 |
| 4,464,712 | 8/1984 | Fletcher | 364/200 |

Primary Examiner—David Y. Eng

Attorney, Agent, or Firm—Wilbert Hawk, Jr.; Edward Dugas; Floyd A. Gonzalez

[57] ABSTRACT

A data processing system including an addressable main memory for storing data and directly executable microinstructions, and a central processing chip having a data interface terminal and an instruction terminal. A processor memory bus is connected between the main addressable memory and the central processing chip data interface terminal. An instruction bus is connected between the central processing chip instruction terminal and the addressable memory.

The directly executable microinstructions in the addressable main memory are fetched from the main memory by an apparatus which includes an instruction address circuit connected to the processor memory bus and the instruction bus. The instruction address circuit includes a virtual address register circuit for receiving a portion of a virtual address from the instruction bus, and a portion of the mentioned virtual address from the processor memory bus. A virtual-to-real translation circuit in the instruction address circuit translates the virtual address in the virtual address register to a real address in the addressable memory from which an executable microinstruction may be fetched.

37 Claims, 16 Drawing Sheets

DIRECT EXECUTION OF SOFTWARE ON MICROPROGRAMMABLE HARDWARE

BACKGROUND OF THE INVENTION

The present invention relates generally to microprogrammable processor-based data processing systems and more particularly to a method and apparatus for storing and retrieving from any virtual memory address, microinstructions which are directly executable by a central processing chip of the data processing system.

Mainframe computer systems are known which execute high level languages by translating the high level languages from a source code to an object code consisting of instructions which may be directly executed by hardware. The translation from the source code of the high level language to an object code of executable instructions is performed by a compiler. Also, many systems are known in which the compiler translates a higher level language into instructions which may be executed by firmware in either a horizontal process or a vertical process.

In some systems, such as the NCR virtual machine emulator, a high-level language is first translated into an intermediate language by a compiler, which intermediate language may be executed by firmware in an emulator mode in which the machine emulates another machine.

Data processing systems are known using microprocessors in an emulation architecture to compile and execute high-level languages. For instance, publication No. RM-0480 available from NCR Microelectronics Division, Colorado Springs, Colo., under the publication No. ST-2104-23 dated September, 1983, discusses the NCR/32 VLSI chip set for use as programmable building blocks for the implementation of high performance digital systems. This chip set includes the NCR/32-000 central processor chip for use in an emulation architecture wherein a high level language is compiled into virtual machine instructions which are stored in a main storage unit accessable by the central processor chip. The central processor chip further includes registers which are used as working registers for emulator chip instructions which reside in an instruction storage unit separate from the main storage unit. In this architecture, virtual machine instructions are fetched from the main storage unit, are decoded, and corresponding emulator chip instructions are fetched from the instruction storage unit such that the decoded instruction is emulated by the chip. This emulation requires, in most instances, many cycles of the central processing chip to execute each virtual machine instruction.

SUMMARY OF THE INVENTION

In a preferred embodiment, the data processing system of the present invention includes an addressable main memory for storing data and directly executable microinstructions, and a central processing chip having a data interface terminal and an instruction terminal. A processor memory bus is connected between the main addressable memory and the central processing chip data interface terminal. An instruction bus is connected between the central processing chip instruction terminal and the addressable memory.

The directly executable microinstructions in the addressable main memory are fetched from the main memory by an apparatus which includes an instruction address circuit connected to the processor memory bus and the instruction bus. The instruction address circuit includes a virtual address register circuit for receiving a portion of a virtual address from the instruction bus, and a portion of the mentioned virtual address from the processor memory bus. A virtual-to-real translation circuit in the instruction address circuit translates the virtual address in the virtual address register to a real address in the addressable memory from which an executable microinstruction may be fetched.

The data processing system may also include an input device for inputting data, including a high level language to be translated into directly executable microinstructions, for storage in the addressable main memory, and a compiler to translate the high level language into directly executable microinstructions.

Directly executable microinstructions may be fetched by the disclosed data processing system in from one to six processor cycles and executed in one cycle, whereas if the central processor chip is used in an emulator architecture as previously known, the central processor chip fetches macroinstructions in 4 cycles and executes them in 50 to 100 processor cycles.

Thus, it is a primary object of the present invention to provide a data processing system whose performance is greatly enhanced by significantly decreasing the number of cycles required to fetch directly executable microinstructions.

It is a further object of the invention to provide a microprogrammable processor-based data processing system which executes compiled high level language code directly rather than in an emulator architecture.

It is a further object of the invention to provide a microprogrammable processor-based data processing system in which the directly executable microcode is stored in the main memory of the system.

It is a further object of the invention to provide a microprogrammable processor-based data processing system wherein a portion of the real address of directly executable microinstructions stored in the main memory is transmitted to an address register over the system data bus, and a portion of the real address of said memory location is transmitted to the virtual address register over an instruction bus in the system.

DESCRIPTION OF THE PREFERRED EMBODIMENT

Figure 1:
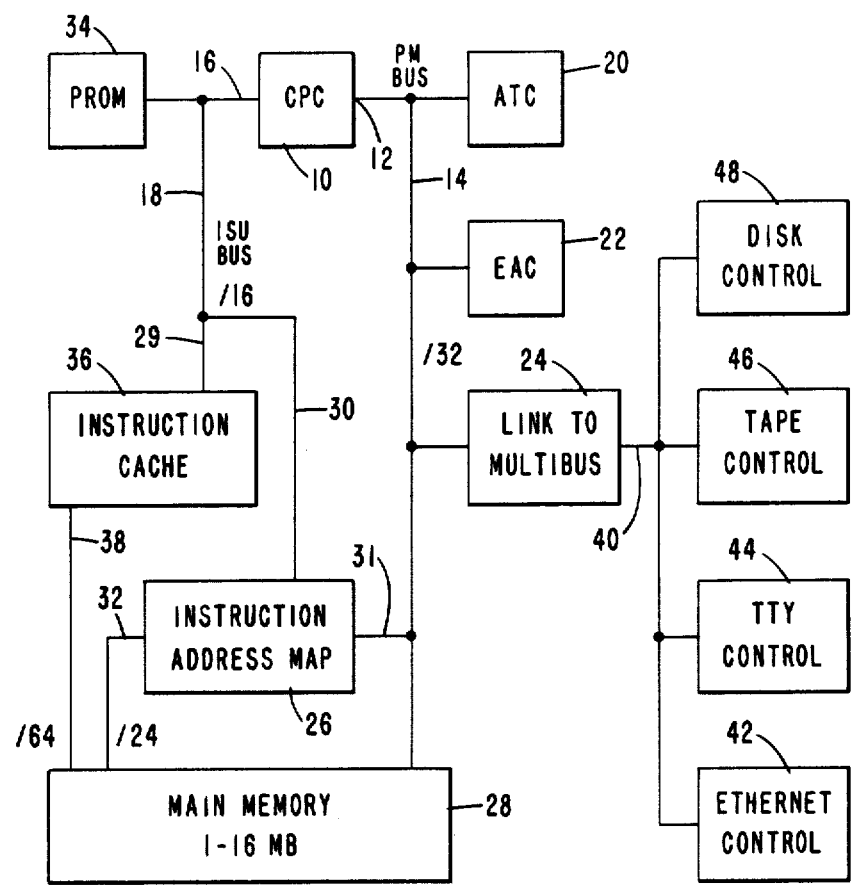
FIG. 1 is a block diagram illustrating a data processing system utilizing the present invention.

FIG. 1 is a block diagram illustrating a microprogrammable processor-based data processing system including a central processing chip (CPC) 10 having a data terminal 12 for connection with a processor memory bus (PM bus) 14, and an instruction input terminal 16 for connection with an instruction storage unit bus (ISU bus) 18. The PM bus 14 is connected to an address translation chip (ATC) 20, an extended arithmetic chip (EAC) 22, a link to MULTIBUS circuit (LIMB) 24, an instruction address map circuit 26, and an addressable main memory unit 28. The instruction address map circuit 26 is also connected to the ISU bus 18 by ISU line (ISUL) bus 30, and to the main memory 28 by buses 31 and 32 as shown.

The ISU bus 18 is additionally connected to a programmable read-only memory (PROM) 34 and an instruction cache circuit 36 by ISU Data (ISUD) bus 29. The instruction cache circuit 36 is additionally connected by a bus 38 to the main memory 28.

The preferred central processor chip is an NCR/32-000 central processor chip available from the NCR Corporation, Dayton, Ohio, and is fully described in the aforementioned reference manual RM-0484 titled "NCR/32 General Information". The preferred CPC 10 is a self contained, 32 bit architecture, microprocessor element that provides the logic to execute a user microinstruction program. The CPC 10 writes data to and fetches data from the main memory 28 over the PM bus 14 which is a 32 bit processor memory bus, also fully explained in the aforementioned reference manual RM-0480.

Data to be stored in and fetched from the main memory 28 by the CPC 10 is placed on the PM bus 14 by virtual addresses. The ATC 20 in the preferred embodiment is an NCR/32-010 address translation chip fully explained in the aforementioned reference manual RM-0480. The ATC 20 provides memory management assistance to the CPC 10. It contains an address translation unit, a memory data syndrome bit generator, syndrome bit checker and data correction logic, a time of day counter/register, memory refresh circuitry, and special registers available to the CPC.

The ATC 20 accepts virtual memory addresses from the CPC 10 over the PM bus 14, and translates these virtual memory addresses to real memory addresses for storing data in and fetching data from the main memory 28 at the real addresses. All of these features are fully discussed in the aforementioned reference manual are outside the scope of the present invention, and will not be further discussed herein.

Microinstructions for execution by the CPC 10 are provided over the ISU bus 18 which is a 16 bit bus fully explained in the aforementioned reference manual. The microinstruction set used by the preferred NCR/32-000 central processor chip is fully set out and explained in Chapter VI of reference manual RM-0480.

The EAC 22 may be one of several circuits for doing extended arithmetic operations, and are well-known in the art. One extended arithmetic chip usable with the invention is designated as 16081 available from National Semiconductor, 2900 Semiconductor Drive, Santa Clara, Calif. 95051.

The LIMB 24 is a hardware interface between the PM bus and a standard input/output bus (I/O bus) to which may be connected various input/output devices such as an ETHERNET control 42, a teletype control 44, a tape control 46, and a disk control 48, or any combination thereof, for controlling various input/output devices for reading data into or writing data out of the microprocessor controlled data processing system of the present invention. The I/O bus may be a conventional bus known by the trademark MULTIBUS of the Intel Corporation of 710 Lakeway, Sunnyvale, Calif. 94086, which is well-known in the data processing art.

The PROM 34 contains the diagnostic routines and the control portion of the kernel. As is known, the kernel handles all interrupts in the order of their assigned priority, handles all system calls, handles switcher routines when they are invoked, programs for transferring data from disk to memory and from memory to disk, and provides program synchronization. The switcher routines of the kernel may terminate the current process, roadblock or temporarily suspend the current process, or preempt the current process. Such kernel programs are well-known and are available from a number of different sources. As is known, the kernel provides a program execution environment for a data processing system, and is hardware-independent. One such kernel program is the UNIX program which is a trademarked product available from AT&T, P.O. Box 967, Madison Square Station, New York, N.Y. 10159.

The kernel routines load the operating system from one or tne storage devices connected to the I/O bus 40 through the LIMB 24 and loads it in a privileged portion of memory. A user program can then be read into the system over I/O bus 40 for execution. The kernel locates the program in virtual memory and stores a portion or page of the program in the main memory 28. The operating system, controlled by the kernel, then steps through the program to operate the data processing system as desired, moving pages of virtual memory to the main memory 28 as may be needed, all of which is well-known and thoroughly understood in the art.

One of the types of programs which may be so loaded and executed are compiler programs which take user source programs written in a high level language, and converts them into microinstruction code which is directly executable by the CPC 10. For instance, a portable "C" compiler also available from AT&T can be modified to take a source program written in the "C" language and converts it to an "object" program having individual instructions in microcode which may be executed by the CPC 10.

To conform the portable "C" compiler to the preferred NCR/32-000 CPC, the CPC microinstruction set set out in Chapter VI of the aforementioned NCR/32 General Information Manual, RM-0480, are placed in the proper microinstruction code module in the compiler programs. As is known in the art, this provides a "C" language compiler which generates object programs compatible with and executable by the preferred NCR/32-000 central processor chip.

As will be understood, the compiled object program may be quite lengthy and contain many hundreds of microinstructions depending upon the complexity, the length, the peripherals to be used, and other factors of the high level language program being compiled. The compiled object program is stored in virtual memory and its location is mapped in instruction address map 26 as will be explained. When the object program is to be executed, the operating system resident in the privileged area of memory, and under the control of the kernel in PROM 34, instructs the CPC 10 to step through the program by fetching directly executable microinstructions over the ISU bus. The CPC 10 fetches instructions using virtual memory addresses; however, the instructions themselves are accessed from main memory.28 and are retrievable by use of real memory locations which specify the actual location in main memory 28 where the instruction is to be found. Therefore, virtual memory addresses issued by the CPC 10 must be converted to real memory addresses before the instruction may be fetched from the main memory 28 and returned to the CPC 10 for execution. In the preferred embodiment, a portion of the virtual memory of an instruction to be fetched is issued by the CPC 10 on the ISU bus 18, and a portion of the virtual address is issued on the PM bus 14. As the compiled object program was being formed in virtual memory, a cross-reference table cross-referencing the virtual address to the real address is additionally stored in a table in main memory. On an instruction fetch command, the ISU portion of the virtual memory is received by the instruction address map 26 over bus 30, and the PM bus portion is received over bus 31 and combined to give an address into the cross-reference table. This combined address is then used to issue a fetch to the main memory to retrieve the real address of the desired instruction. A portion of this real address is then latched into a page register in the instruction address map, and the contents of this register is used to construct the real address in main memory corresponding to the virtual address where the desired directly executable microinstruction is stored. This microinstruction is passed from the main memory over bus 38 to the instruction cache 36, and from there over the ISU bus 18 to the CPC for execution, as will be explained.

It will be understood that fetched instructions are stored in the instruction cache 36 such that future fetches to the same addresses may be located in the instruction cache without having to go to main memory 28.

Figure 2:
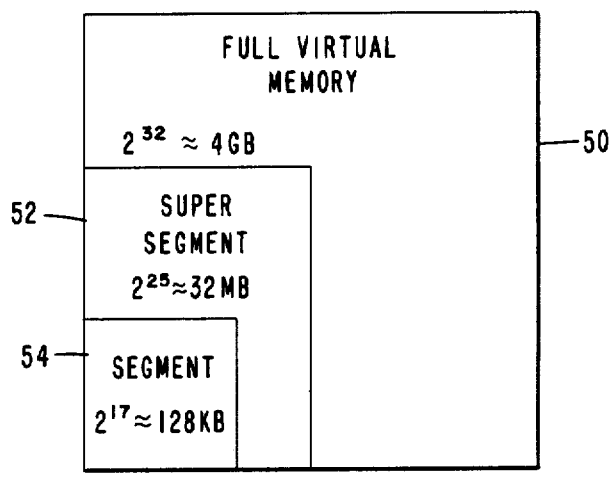
FIG. 2 is a diagrammatic representation of the virtual memory of the system of FIG. 1.

At this point, it will be helpful to review the difference between virtual memory and real memory. Turning to FIG. 2, an illustration is shown of the full virtual memory of the data processing system. The virtual memory 50 is stored on an random access device such as a disk controlled by disk control 48 of FIG. 1, such that portions of the virtual memory 50 may be read into the real memory of the data processing system as needed. The virtual memory of the exemplary system is $2^{32}$ bytes or approximately 4 gigabytes in size, addressed by virtual memory addresses made up of 32 bits. In the present system, the virtual memory 50 is divided into a plurality of super segments 52, each of which is $2^{25}$ bytes, or approximately 32 megabytes in size. As will be discussed, any virtual storage location in a super segment may be addressed by a virtual address 25 bits in length. Each super segment is hardware supported such that a virtual address in a super segment 52 may be decoded, providing direct hardware access to any virtual memory location in the addressed super segment.

The super segment in the present system is intended to be restricted to a single user. However, as is known, the kernel program such as UNIX, provides for multiple users residing simultaneously in the virtual memory of a data processing system. Kernel routines may be written such that if a single user exceeds the virtual memory bounds of the 32 megabyte super segment assigned to him, the software purges the hardware, establishes a new super segment, and continues with processing. It will be understood that such a provision for crossing the boundaries of a super segment is time-consuming. If such a capability is provided in the kernel routines, it will only be used rarely because there are few applications which would require more than 32 megabytes of storage.

Each super segment contains a plurality of segments 54 having a $2^{17}$ byte size or 128 kilobytes of storage. The segment 54 of 128 kilobytes of storage is addressable by the CPC 10 over the ISU bus 18 to a separate 128 kilobyte instruction storage unit, when the preferred CPC 10 is used as originally designed.

Figure 3:
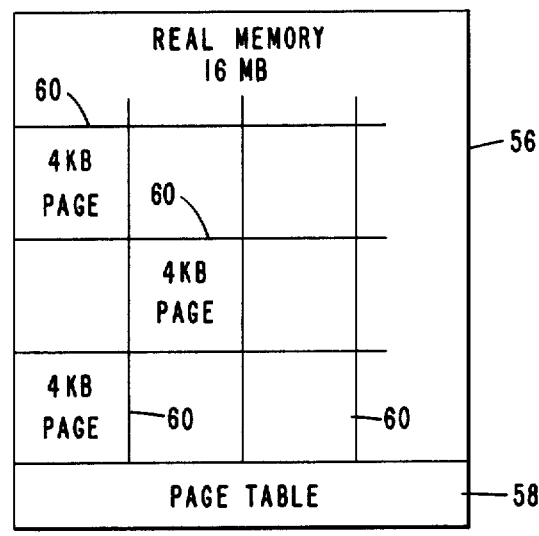
FIG. 3 is a diagrammatic representation of the real memory of the system of FIG. 1.

FIG. 3 provides a diagrammatic illustration of the real memory 56 present in the main memory 28. The real memory 56 contains 16 megabytes of storage, and includes a portion reserved for a page table 58, and a plurality of portions 60, each of which may contain a 4 kilobyte page of data from the virtual memory 50. The page table 58 contains the real memory address of the beginning of each 4 kilobyte page 60. As will be discussed, when the CPC wishes to fetch an instruction at a particular location in virtual memory, a fetch is made into a corresponding entry in the page table 58 to find if the desired virtual memory location is stored in real memory. If the desired memory location is part of a page stored in one of the page storage locations 60, the page table 58 will direct the hardware to the proper location in the 4 kilobyte page to retrieve the instruction from the desired location. If however, the desired location is not presently stored in the real memory 56, an indication is present in the page table 58 which directs the kernel to retrieve the page in virtual memory 50 containing the desired location, and to store it in the next available page storage location 60 in the real memory. If there are no storage locations 60 available in the real memory 56, one of the old pages is overwritten with the new, desired page. The old page, if it had been altered, will be rewritten to disk before it is overwritten. The page table entries are then updated to reflect the new configuration of the real memory 56. Thus, it can be seen that pages may be swapped from the virtual memory 50 into the real memory 56 into any available page storage section 60. After the desired page is located in real memory, and the page table 58 is updated, the data processing system returns to the task it was performing before the page swapping took place.

Figure 4:
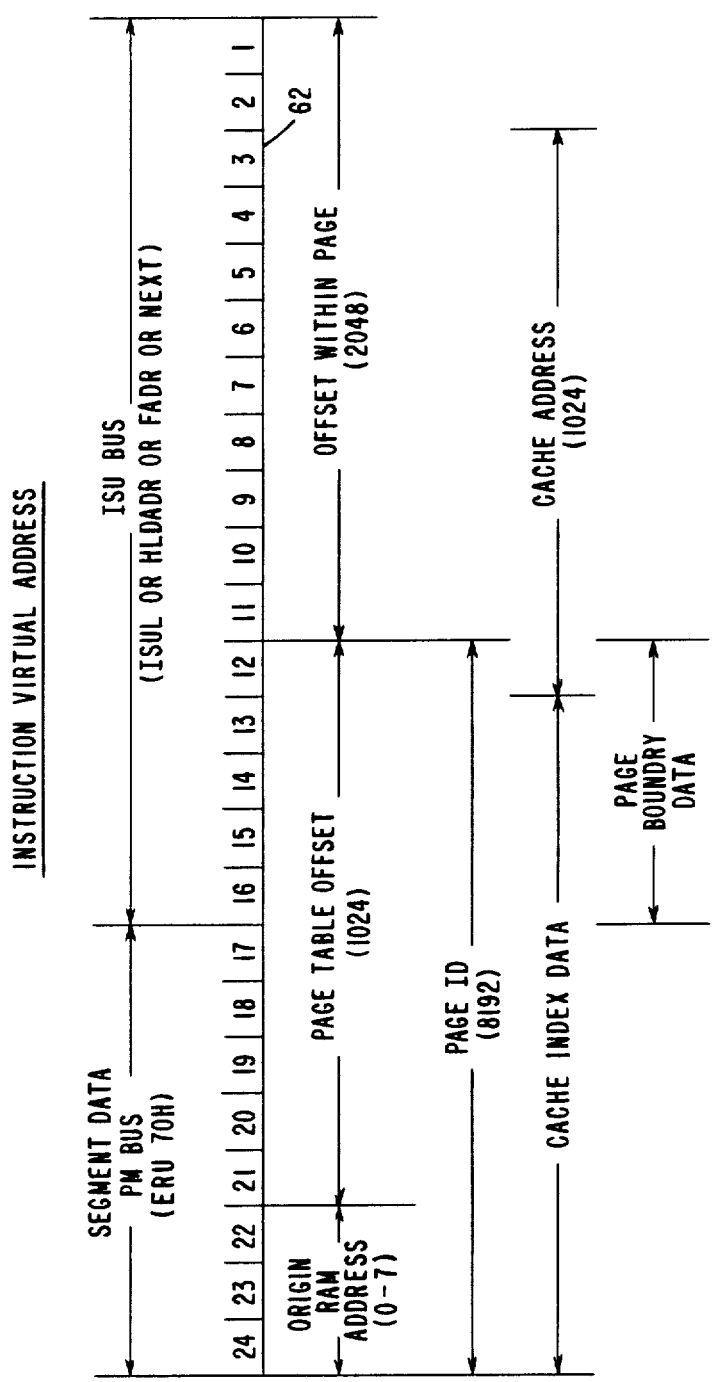
FIG. 4 is an illustration of the instruction virtual address.

FIG. 4 represents an instruction virtual address. The numbers 1-24 on horizontal line 62 represent the bits which make up the instruction virtual address. As discussed in connection with FIG. 2, the instruction virtual address provides for addressing of 32 megabytes in the super segment 52. Bits 1-16 are sent by the CPC 10 over the ISU bus 18 to the ISUL bus 30 of FIG. 1, to be discussed later. A portion of the instruction virtual address shown in FIG. 4 as bits 17-24 and identified as segment data, is sent by the CPC 10 over the PM bus 14 and the bus segment 31 to a segment register in the instruction address map 26, as will be discussed.

Bits 1-11 of the instruction virtual address shown in FIG. 4 represent the offset within the page designated by bits 12-24 as is stored in one of the segments 60 shown in FIG. 3. The offset within the page can have up to 2048 values and represent one instruction, each of which resides in 2 bytes of memory. Thus, the 2048 instructions represent 4 kilobytes of memory. As previously mentioned, each super segment 52 shown in FIG. 2 contains 8192 page entries of 4 kilobytes each. Thus, bits 12-24 of the virtual address can address any one of the 8192 pages in a super segment. Bits 12-24 of the virtual address refer to the page ID, and represent 8192 pages. The page ID is decoded by the use of page table 58 shown in FIG. 3, and is used to find the beginning address of the page in real memory, if the page is stored in real memory 56 as previously described. Each page table has 1024 entries as identified by the page table offset of bits 12-21 of the instruction virtual address. As shown in FIG. 4, bits 12-16 are originally provided over the ISU bus, and bits 17-21 are originally provided over the PM bus. The final three bits, bits 22-24, provide an address into an origin RAM, as will be explained. Bits 22-24 may have any one of the values 0-7, thus pointing to one of eight page tables, each one of which has 1024 entries.

As will be discussed later, bits 3-12 provide a cache address having 1024 entries, and bits 13-24 are stored in a cache index RAM used to determine if the desired instruction is stored in the cache buffer, as will be explained. Bits 12-16 are used as a page boundary check for verifying if an address is within the same page boundary as the previously-fetched address, as will be explained.

Figure 5:
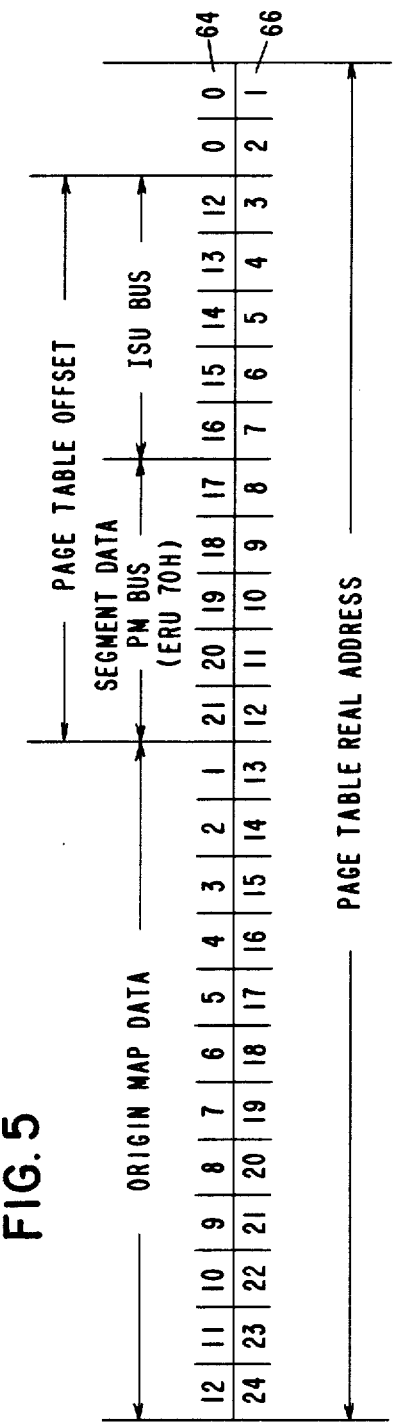
FIG. 5 is an illustration of the page table real address.

FIG. 5 is an illustration of the page table real address derived from the page table ID of FIG. 4. The numbers on horizontal line 64 identify bits as they are numbered in their indicated sources. The numbers on horizontal line 66 indicate the bit numbers of the page table real address. It will be understood that the page table real address is used to access the page table 58 illustrated in FIG. 3, wherein the real address of the beginning of the desired page is given. Bits 1 and 2 are set to 0 as shown in FIG. 5, as these two bits are not used in the fetching of data from the real memory 56. Bits 3-12 of the page table real address are made up of bits 12-21 of the virtual address identified in FIG. 4 as the page table offset. Bits 13-24 of the page table real address are made up of bits 1-12 of data from an origin RAM. It will be understood that the origin RAM, to be discussed later, includes at least 8 entries, having 12 bits for each entry. Bits 22-24 of the virtual address shown in FIG. 4 is used to access one of these 8 entries in the origin RAM, to obtain the origin map data bits 13-24 of the page table real address.

After the page table real address is constructed as shown in FIG. 5, a memory fetch is issued to the main memory 28 of FIG. 1 by the Instruction Address Map 26, and 4 bytes starting with the location in main memory of the page table real address are returned to the Instruction Address Map 26, over the PM bus 14. Twelve bits of these 4 bytes represent the beginning address of a section 60 in the real memory 56 in which the desired 4 kilobyte page of instructions is stored. This page table data is shown in FIG. 6, as will now be explained.

Figure 6:
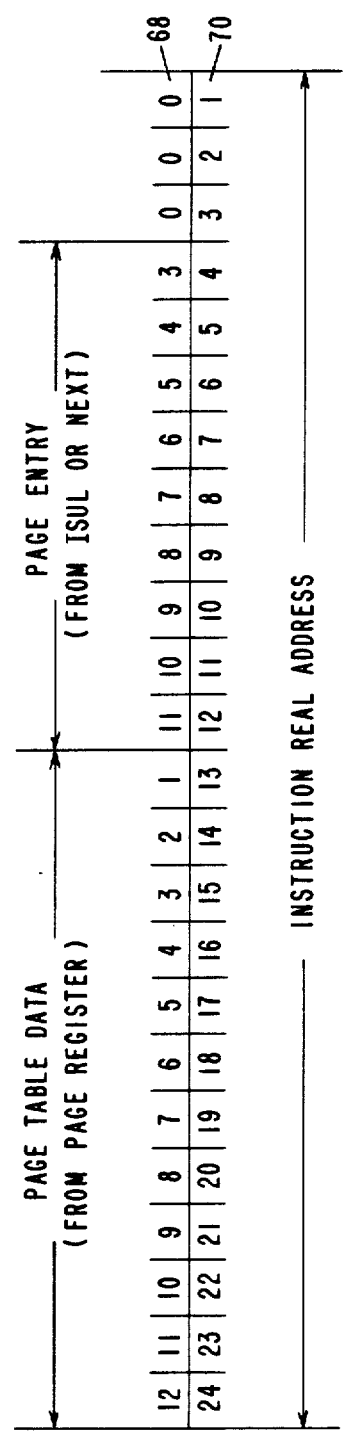
FIG. 6 is an illustration of the instruction real address.

FIG. 6 illustrates the instruction real address which is translated from the instruction virtual address. The numbers in horizontal line 68 are the bit numbers of the instruction real address as they were identified in their sources. The numbers on horizontal line 70 represent the bit numbers of the instruction real address. Bit numbers 1—3 are set to 0, as these bits are not used in an instruction memory fetch operation. Bits number 4-12 of the instruction real address are made up of bits 3-11 of the offset within page data of FIG. 4 of a desired instruction address issued over the ISU bus. The page table data obtained from the page table 58 of the real memory 56, makes up bits 13-24 of the instruction real address as explained in connection with FIG. 5. Each memory fetch instruction using the instruction real address shown in FIG. 6 will obtain 4 instructions starting at the instruction real address constructed as shown in FIG. 6. As bits 3-11 represent 1024 entries, it will be understood that the instruction real address constructed in accordance with FIG. 6 may address locations anywhere in the 4 kilobytes of instruction data in a page stored in a page segment 60 as shown in FIG. 3.

Figure 8:
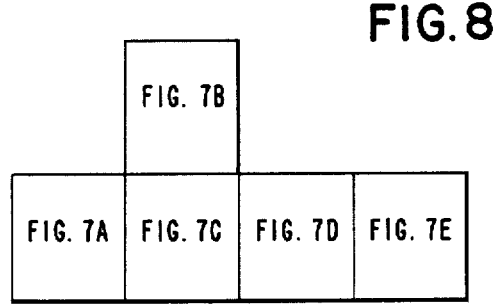
Figure 7A:
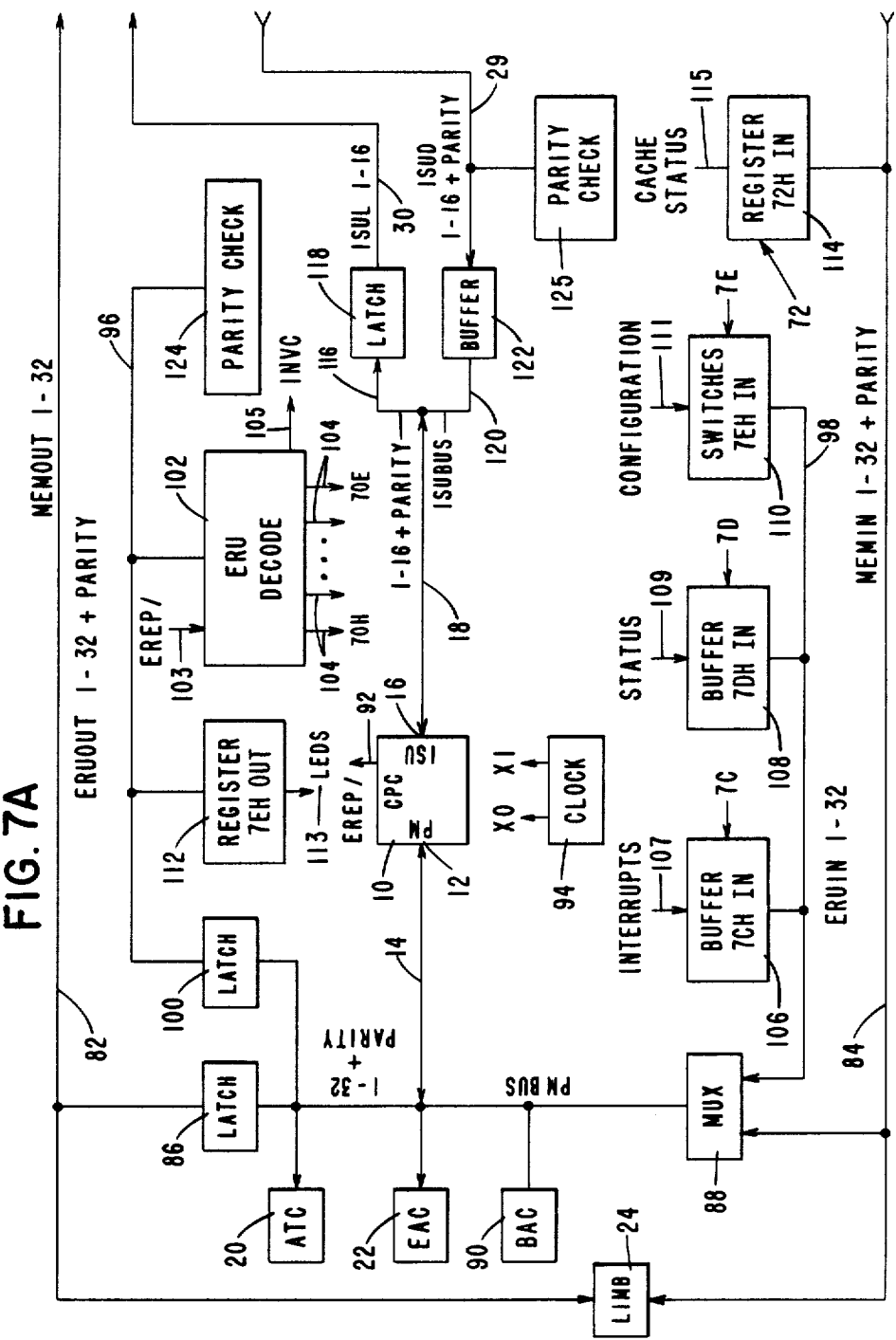
FIGS. 7A-7E, assembled in accordance with the map of FIG. 8, is a block diagram of the data processing system of FIG. 1.

FIGS. 7A-7E assembled in accordance with the map of FIG. 8, is a block diagram of the data processing system. FIG. 7A presents a more detailed diagram of the connections of CPC 10, and the elements of the PM bus 14 and the ISU bus 18. The PM bus 14 connects to a 32 bit memory output (MEMOUT) bus 82, and a 32 bit memory input (MEMIN) bus 84. The MEMOUT bus 82 provides data to the LIMB 24, the instruction address map 26, and the main memory 28, as discussed in connection with FIG. 1. Data output by the CPC 10 onto the PM Bus 14 is placed on the MEMOUT bus 82 by a latch 86. The MEMIN bus 84 provides data from the main memory 28 to the PM Bus 14 through a multiplexer (MUX) 88, and also provides data from the main memory 28 to the LIMB 24 as shown.

The extended arithmetic chip 22 and the address translation chip 20 are connected to the PM Bus 14, and perform as described in connection with FIG. 1. A bus assist chip (BAC) 90 is also connected to the PM Bus 14, and may be any one of a number of conventional bus assist chips which sense data being transmitted over the PM Bus 14, and assist data transitions thereby speeding up and making more certain the reading of data on the PM Bus 14 by the various chips connected thereto.

The preferred CPC 10 is able to directly communicate, responsive to appropriate commands of its microcode, with registers in an external register unit (ERU). The ERU register locations are implemented external to the CPC 10 and are accessed over the PM bus 14. An external register enable/permit (EREP/) signal is generated by the CPC 10 and placed on the output lead 92 to enable the transfer of an external register message over the PM bus. A system clock 94 having a two phase output (X0,X1) is provided to control the CPC 10 and time the system, as is known.

An external register transfer is a three stage operation consisting of bus arbitration leading to device selection, register selection during X0, and data transferred during X1. Output data from the CPC 10 to an ERU is provided over either the MEMOUT bus 82 or ERUOUT bus 96, while input messages from an ERU to the CPC 10 are provided over either the MEMIN bus 84 or an ERUIN bus 98. Data transferred from the PM bus 14 to the ERUOUT bus 96 is controlled by latch 100, and data transferred from the ERUIN bus 98 to the PM bus 14 is controlled by the previously mentioned multiplexer 88.

When the CPC 10 is to transfer data to an ERU, the CPC 10 requests access to the PM bus 14. When access is granted, the ERU address is latched in latch 100 and placed on the ERUOUT bus 96 during X0. An ERU decode circuit 102, responsive to the EREP/signal input at 103, decodes the address on ERUOUT bus 96 and transmits an enable signal over one of the enable lines 104 to enable the ERU register addressed. Of the ERU registers addressable by the CPC 10, registers 70 (H) through register 7E (H) are addressed by ERU decode circuit 102 and will be discussed further herein. The other ERU registers supported by CPC 10 are used in their conventional manner for control of the CPC 10 and the data processing system as discussed in the aforementioned NCR manual RM-0480.

After connection is established between the addressed ERU register by ERU decode circuit 102, the data to be transferred to the addressed ERU is placed on the PM bus, latched in latch 86 and latch 100 thereby placing the data on MEMOUT bus 82 and ERUOUT bus 96 during X1. Thus, the addressed ERU register enabled by the appropriate line 104 accepts the data placed on either the MEMOUT bus 82 or ERUOUT bus 100 during the X1 portion of the clock.

When data is sent to the ERU register 70(H), the ERU decode circuit 102 also outputs an Invalid Compare (INVC) signal on its output lead 105, to be discussed later.

Data may be, in a reverse procedure, accepted directly from an ERU register by the CPC 10 over the PM bus 14. In this process, responsive to an appropriate command, the CPC 10 gains access to the PM bus 14, transmits the address over PM bus 14 to ERUOUT bus 96 of the desired ERU register from which data is to be accepted, and accepts the requested data from either the MEMIN 84 or ERUIN bus 98 through multiplexer 88 during X1.

ERU register 7C (H) IN 106 is used to transmit various interrupt signals 107 from the system to the CPC 10. ERU register 7D (H) IN 108 is used to transmit certain status signals 109 of the system to the CPC 10, and ERU register 7E (H) IN 110 is used to transfer configuration signals 111 set by configuration switches to the CPC 10. These switches may be used to communicate the configuration, such as peripheral assignments, to the CPC 10 for use in controlling data communication between the data processing system and various peripherals connected to the IO bus 40 discussed in connection with FIG. 1. The output command of CPC 10 to ERU register 7E (H) OUT 112 illuminates a series of light emitting diodes (LED) 113 to give a visual indication of the status and configuration of the system.

Certain ERU registers are connected to the MEMIN bus 84 whose data is passed from the register to the CPC 10 through the multiplexer 88. One such register is ERU register 72 (H) IN 114 which collects cache status signals 115 to be transmitted to the CPC 10 when requested.

The ISU bus 18 of FIG. 1 includes an intermediate output bus 116 connected to a latch 118, and an intermediate input bus 120 connected to a buffer 122. The latch 118 places ISU address from the ISU terminals 16 of CPC 10 on the ISUL bus 30 of FIG. 1, which is connected to the instruction address map circuit 26. ISU input data from the instruction cache circuit 36 to the ISU terminal 16 comes from the ISUD bus 29 of FIG. 1, through buffer 122.

Conventional parity check circuits 124 and 125 are connected to ERUOUT bus 96 and ISUD bus 29 respectively for checking for parity bit errors on their respective buses.

Figure 7B:
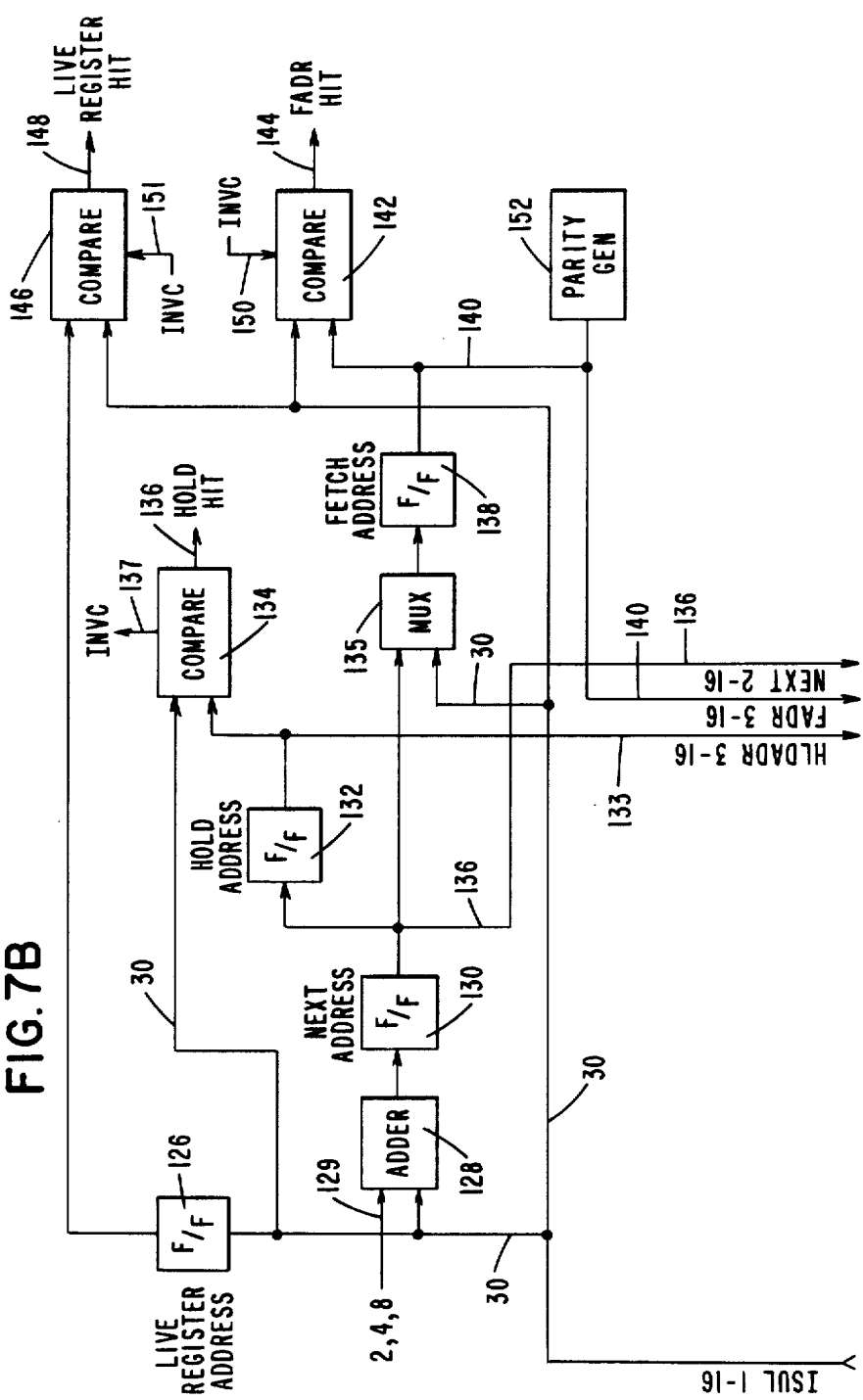

FIG. 7B provides a functional block diagram of a prefetch circuit which is a portion of the instruction address map circuit 26 of FIG. 1. It has been found that in the majority of application programs, greater than 90% of the instructions directly follow the previously-executed instruction. The prefetch circuit of FIG. 7B is provided to obtain an instruction which follows the presently executing instruction, such that when the presently executed instruction has been completed, there is a high probability that the next instruction of the program has been fetched by the prefetch circuit and be waiting in the cache buffer. This prefetch function significantly speeds up the execution of the data processing system by efficiently making use of otherwise idle time to obtain instructions which will most likely be needed next.

The prefetch circuit of FIG. 7B includes a live register address register 126 in which is stored bits 2-16 of the super segment virtual address of the presently executing instruction. This is the ISU portion of the immediately preceding virtual address received on the ISUL bus 30.

Also connected to ISUL bus 30 is an adder 128 for calculating the address to be prefetched. Depending upon the instruction code state (as will be explained later in the description of FIG. 10), the adder 128 adds 2, 4 or 8 to the virtual address on the ISUL bus 30 to calculate the next address. This calculated next address is stored in a next address register 130 whose input is connected to the output of adder 128. The output of the next address register 130 is connected to the input of a hold address register 132, the input of a multiplexer 135, and to a NEXT bus 136 used to transmit bits 2-16 of the NEXT address to other parts of the circuit as will be described. The output of the hold address register 132 is connected to one input of a compare circuit 134 which compares the address held in hold address register 132 with the address on the ISUL bus 30 connected to its other input. If the comparison circuit 134 determines that the address on its inputs are equal, a hold hit signal is placed on hold hit conductor 136. Compare 134 includes an invalidate compare input 137 for receiving the INVC signal from ERU decode circuit 102 which forces a non-compare output on conductor 136, even if the addresses input to compare 134 are equal.

Multiplexer 135 controls the passing of either the NEXT address output from the next address register 130, or the address on the ISUL bus 30 to a fetch address register 138. The output of fetch address register 138 is placed on a fetch address (FADR) bus 140, connected to a compare circuit 142. The other input of compare circuit 142 is connected to the ISUL bus 30. An output 144 of the compare circuit 142 provides a FADR hit signal when the addresses on the ISUL bus 30 and the FADR bus 140 are equal. A compare circuit 146 is also provided to compare the previous virtual address in the live register address register 126 and the present address on the ISUL bus 30. The output of compare circuit 146 is a live register hit lead 148 which indicates if the present address on ISUL bus 30 and the previous address in the live register address register 126 are equal. Compare circuits 142 and 146 are provided with inputs 150 and 151 respectively for inputting the INVC signal and holding the outputs 144 and 148 in a non-compare condition when activated.

As will be explained, a live register is provided which stores directly executable microcode instructions located in four consecutive addresses starting on a modulo four boundary in main memory 28. It is only necessary to compare bits 3-16 (or 2-16 while using PROM 34) of the virtual address on the ISUL bus 30 with bits 3-16 of the addresses input to comparator 146 to determine if the requested address is present in the live register.

A conventional parity generator 152 is provided to generate parity bits on the FADR bus 140 which are used for conducting parity bit error checks in other portions of the circuit. A HLDADR bus 133 is provided to transmit bits 3-16 of an address of hold address register 132.

Figure 7C:
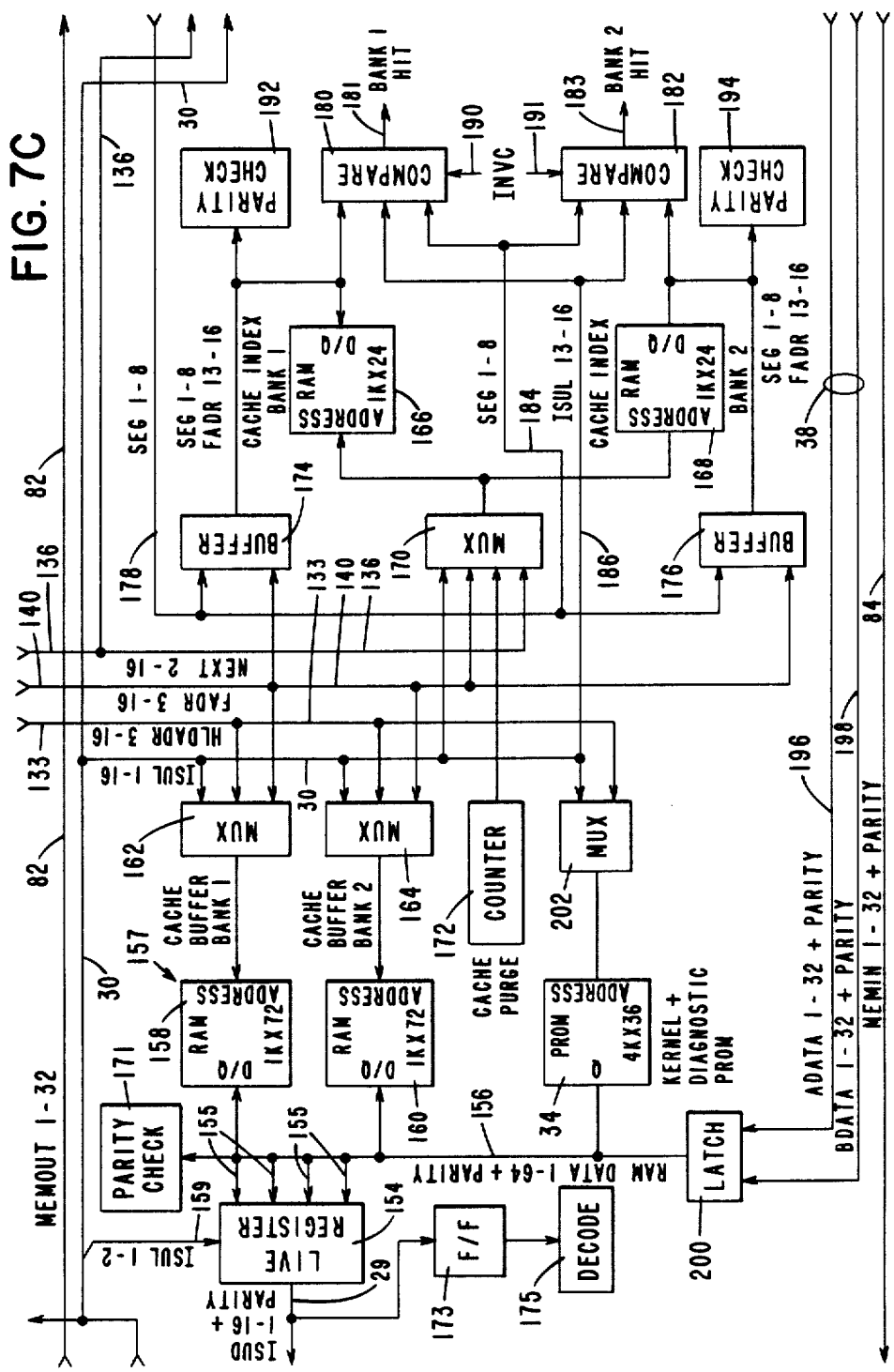

FIG. 7C is a block diagram of the instruction cache circuit 36 of FIG. 1, and includes the connection details of PROM 34 also shown in FIG. 1. The instruction cache includes a live register 154 which holds four microcode instructions of 16 bits each. The microcode instructions are input into the live register 154 over buses 155 from a RAMDATA bus 156 which transmits 64 bits of data at one time (or 32 bits of instructions from PROM). Live register 154 is a tri-state device which may latch 64 bits on its inputs, and which places on the ISUD bus 29 connected to its output one of four groups of 16 bits dependent upon the value of the two least significant bits from ISUL bus 30 over bus 159. Thus, if the value of the first two bits of the address on ISUL is zero, the first group of 16 bits is placed from live register 154 on the ISUD bus 29. If the first two bits of the ISUL address is equal to one, the second group of 16 bits is placed on ISUD bus 29, if the value is two, the third group of 16 bits is placed and if the value is three, the fourth group of 16 bits is placed. It will thus be understood that the live register 154 contains four instructions at one time, and the first two bits of the ISUL address determines which of the four instructions will be transmitted over the ISUD bus 29 to the CPC 10.

A cache buffer 157 includes two 1K by 72 bit RAM banks 158 and 160 are provided for storing 1,024 groups of four microcode instructions. When outputting data from the RAM banks 158 or 160 to the live register 154, a cache address is input at the address terminals of the respective RAM bank, and the data is transmitted from the D/Q terminal onto RAM data bus 156. Also, when writing data from the RAM data bus 156 into either the RAM bank 158 or the RAM bank 160, a RAM address is placed on the address terminal of the respective RAM bank 158 or 160 and the data is transferred into the D/Q terminal for storage at the indicated address. Multiplexers 162 and 164 control the passing of addresses from the ISUL bus 30, the HLDADR bus 133, or the FADR bus 140, to the address terminals of the RAM's 158 and 160 respectively, as will be explained. Referring to FIG. 4, bits 3-12 of the virtual address on the ISUL bus, identified as cache address, is used to provide access to the 1,000 storage addresses in the RAM banks 158 and 160.

A cache index 165 is provided by RAM banks 166 and 168 in which are stored bits 13-24 of the user segment virtual address, shown in FIG. 4 as cache index data.

When a block of four instructions is fetched from the main memory MSU 28 which has not been previously fetched, it is stored in the cache buffer 157, and its cache index data is stored at a corresponding location in the cache index 165. During the prefetch operation, the cache index data of the virtual address being prefetched is compared to the cache index data stored in the cache index 165. If the cache index data of the address being prefetched is the same as the cache index data stored in the cache index 165, it is not necessary for the instructions of the virtual address being prefetched to be fetched from the main memory 28. A multiplexer 170 is provided for controlling the passing of the cache address from ISUL bus 30, FADR bus 140, NEXT bus 136 or from a counter 172 to the cache index 165. The counter 172 counts through the 1,024 addresses, and is used to purge the cache upon certain unrecoverable memory errors and when the user segment boundary is changed, as previously explained in connection with FIG. 2.

Buffers 174 and 176 are provided for passing cache index data to the D/Q terminals of the cache index RAM's 166 and 168 during RAM store operations. As will be explained, the PM bus portion of the user segment virtual address, bits 17-24 of FIG. 4, are placed on a segment (SEG) bus 178. Buffers 174 and 176 are connected to the SEG bus 178 and the FADR bus 140. During a store operation, the eight bits on the SEG bus 178 and bits 13-16 on the FADR bus 140 from buffers 174 or 176 are passed to the D/Q inputs of the respective cache index RAM's 166 and 168 for storing at the address passed by multiplexer 170.

Compare circuits 180 and 182 are provided to compare the cache index data of the desired virtual address with the cache index data stored in the cache index 165, as previously described. The desired segment data is placed on one input of the compares 180 and 182 over bus 184 from bus 178, and bits 13-16 from the ISUL bus 30 is transmitted to the inputs of compare circuits 180 and 182 over bus 186 to complete the cache index data of the desired virtual address for comparison with the cache index data stored in the cache index 165. Equal compares by comparator 180 results in a bank one hit signal on comparator output 181, and equal compares by comparator 182 results in a bank two hit signal on comparator output 183. Control terminals 190 and 191 are provided in comparators 180 and 182 respectively to force unequal compare outputs on comparitors output 181 and 183 responsive to an input of an INVC signal. Parity check circuits 192 and 194 are provided as shown to make conventional parity bit error checks of cache index data stored into and read out of the cache index 165.

As will be explained, four microcode instructions are read at a time from the main memory 28. Two instructions are read from an A portion of the main memory and placed on ADATA bus 196. At the same time, two instructions are read from a B portion of the main memory 28 and placed on a BDATA bus 198. The ADATA bus 196 and BDATA bus 198 are part of the bus 38 of FIG. 1. A latch 200 latches the two instructions on the ADATA bus 196, and the two instructions on the BDATA bus 198 and places them on the RAM data bus 156 for storage in the cache buffer 157 as described.

The division of the cache into separate banks, such as bank 1 and bank 2 shown herein, and their set associative operation is well known and understood by those skilled in the art, and thus will not be explained further here.

A multiplexer 202 has its inputs connected to the ISUL bus 30, and the HLDADR bus 133, and its output connected to the address input of the PROM 34. The PROM 34 is operated much like a cache except that all of the instructions in the PROM routines are permanently stored in the PROM 34. Also, the PROM 34 is two instructions wide, and thus stores two microinstructions at each address rather than four as are stored in the cache. For this reason, whenever a PROM routine is being executed, the value two is input at input 129 of adder 128 to calculate the next address as discussed in connection with FIG. 7B. When a PROM routine is being executed, the address of the next desired instruction will either appear on the ISUL bus 30, or will result in a hold hit, in which case the address will appear on the HLDADR bus 133.

A conventional parity check circuit 171 is connected to the RAM data bus 156 to perform parity checks of the data on bus 156. A flip-flop circuit 173 and a decode circuit 175 are provided to decode the instructions appearing on the ISUD bus 29 for breakpoint, trap and interrupt conditions, and to send corresponding signals to the CPC 10 by way of appropriate ERUs if one of these conditions is found.

Figure 7D:
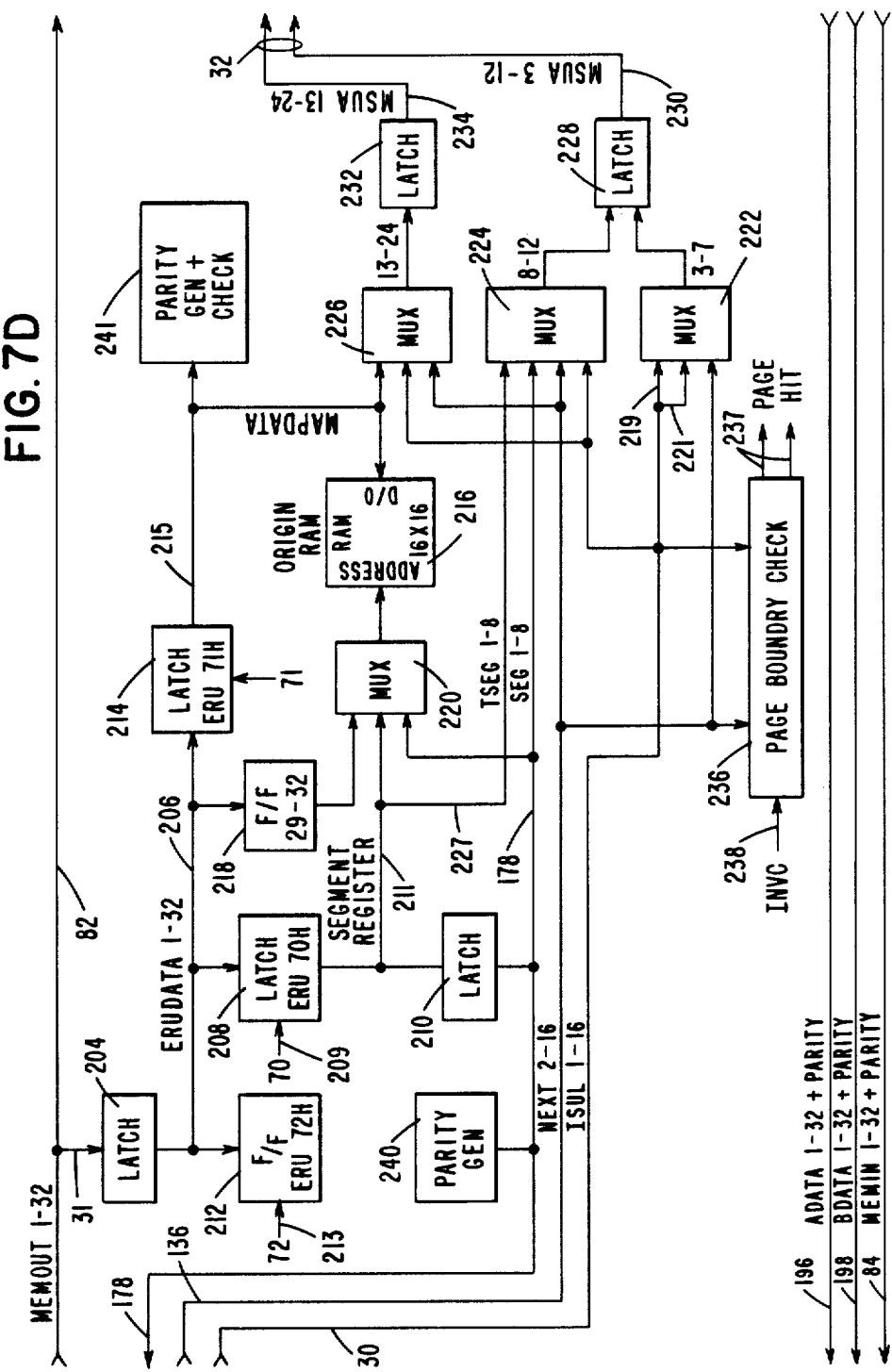

FIG. 7D is a block diagram of the remaining portion of the instruction address map 26 of FIG. 1 for the translation of virtual-to-real instruction addresses. As previously explained, when data is output to an ERU register, the ERU register address is output by the CPC 10 to the ERU decode circuit 102 during X0, and the data to be stored in the addressed ERU is placed on the MEMOUT bus 82 during X1. In FIG. 7D, a latch 204 latches data on the MEMOUT bus 82 and places it on an ERUDATA bus 206. Latch 208 is ERU register 70 (H) and is enabled by a proper signal from the ERU decode circuit 102 of FIG. 7A received at its input 209. ERU 70 (H) 208 is a segment register which stores the segment data identified in FIG. 4 as bits 17-24 of the virtual address. This segment data is passed to latch 210 and placed on the SEG bus 178 discussed in connection with FIG. 7C. Flip-flop 212 enabled by an output command addressed to ERU register 72 (H) at input 213, allows the CPC 10 to send certain signals to the instruction cache. This provides for status inquiries to be communicated between the cache and the CPC 10. Latch 214, enabled by a signal from the ERU decode circuit 102 of FIG. 7A provides an ERU register 71 (H). ERU register 71 (H) is a MAPDATA storage register, whose use will be explained.

A 16 by 16 bit RAM 216 provides an origin RAM for storing page table origin RAM data identified herein as MAPDATA. A flip-flop 218 has its input connected to the ERU data bus 206 and is a register for storing the origin RAM address in the origin RAM 216. A multiplexer 220 controls the passing of origin RAM addresses from either the flip-flop 218, bits 6-8 of the segment register 208, or bits 6-8 from the SEG bus 178.

When the KERNEL is setting up the page table 58 in real memory as discussed in connection with FIG. 3, the origin MAPDATA discussed in connection with FIG. 5 is placed on the MEMOUT bus 82 and latched into ERU 71 (H) 214. The origin RAM address corresponding to the origin MAPDATA is placed at the same time on the MEMOUT bus 82 and latched into flip-flop 218 for use as the address of the origin RAM 216. The multiplexer 220 then passes the origin RAM address from flip-flop 218 to the address terminal of the origin RAM 216, and the MAPDATA latched in ERU 71 (H) 214 is provided to the D/Q terminal of the origin RAM 216 for storage.

In addition to the eight origin RAM addresses discussed in connection with FIG. 4, additional origin RAM entries are provided in RAM 216 and used for page table entries to direct fetches to the privileged portion of the main memory 28 for use by system programs. Such privileged entries are provided for by including a fourth bit in the RAM address which is given a value of 1 for privileged operations, and a value of 0 for user operations. Multiplexers 222, 224, and 226 are connected as shown in FIG. 7D for providing the bits of the MSU address to the main memory 28 for various types of memory fetch operations.

Multiplexer 222 provides bits 3-7 of the MSU address, and has three inputs. Inputs 219 and 221 of multiplexer 222 are connected to the ISUL bus 30, and the remaining input is connected to the NEXT bus 136. Multiplexer 224 provides bits 8-12 of the MSU address and has four inputs. One input is connected to ISUL bus 30, one input is connected to NEXT bus 136, and one input is connected to the SEG bus 178. The fourth input of multiplexer 224 is connected to the output of the segment register by a TSEG bus 227. Multiplexer 226 provides bits 13-24 of the MSU address, and has 3 inputs. One input is connected to the next bus 136, one input is connected to the ISUL bus 30, and the third input is connected to the map data bus 215.

The outputs of multiplexers 222 and 224 are connected to a latch 228, and has its output connected to an MSUA bus 230 which carries bits 3-12 of the MSU address. The output of multiplexer 226 is connected to a latch 232 whose output is connected to an MSUA bus 234 carrying bits 13-24 of the MSU address.

A page boundary check circuit 236 is provided having one input connected to the ISUL bus 30, and a second input connected to the NEXT bus 136. The page boundary check circuit 236 includes a storage register for storing bits 12-16 of the user segment virtual address identified as page boundary data in FIG. 4. This page boundary storage register stores the page boundary data of the previously translated instruction virtual address which appeared on the ISUL bus 30, and is checked against the present address on the ISUL bus 30 or the present address on the NEXT bus 136, depending upon which bus contains the address to be fetched. If there is an equal compare, a page hit signal is placed on one of the outputs 237 of the page boundary check circuit 236. A control terminal 238 forces the comparisons of the page boundary check circuit 236 to a non-compare condition.

A conventional parity generator circuit 240 is connected to SEG bus 178 to generate parity bits for the segment data thereon. A parity generator and check circuit 241 is connected to map data bus 215 for generating parity bits for MAPDATA signals coming from ERU register 71(H) to be stored in RAM 216, and for performing conventional parity checks of data on the MAPDATA bus 215 coming from the origin RAM 216.

TSEG bus 227 connected between bus 211 and multiplexer 224 provides for passing data representing real addresses directly from the ERUDATA bus 206, through the multiplexers 224 and 226, to the MSUA buses 230 and 234. This may be done by passing MSUA bits 18-24 through multiplexer 226 from ERU 71(H) 214 and the map data bus 215, and MSUA bits 8-12 through multiplexer 224 from the TSEG bus 227, thereby allowing for retrieving data from real locations without first obtaining page table data from the page table portion of main memory 28.

The system also allows for the CPC 10 to be used in its conventional manner. This is done by reserving the first 128K of memory in the main memory 28 and treating it as an instruction storage unit (ISU) in the conventional manner. When operated in this way, an ISU address is placed on the ISUL bus 30. Multiplexers 222, 224 and 226 then pass the ISU address on ISUL bus 30 to the MSUA buses 230 and 234 for reading instructions stored in the first 128K of main memory 28. The ISU address is passed by transferring MSUA bits 3-7 from the ISUL bus 30 over bus 221 through multiplexer 222, MSUA bits 8-12 from the ISUL bus 30 through multiplexer 224, and MSUA bits 13-16 from the ISU bus 30 through multiplexer 226. MSUA bits 14-24 are turned off to insure that the first 128K of main memory 28 is addressed. The four instructions fetched in response to this address are stored in the live register 154 of FIG. 7C, and the system is operated as described herein, thereby providing that the CPC 10 may be operated in its conventional manner such as in an emulator mode in accordance with its original design as discussed in the aforementioned publication RM-0480.

Figure 7E:
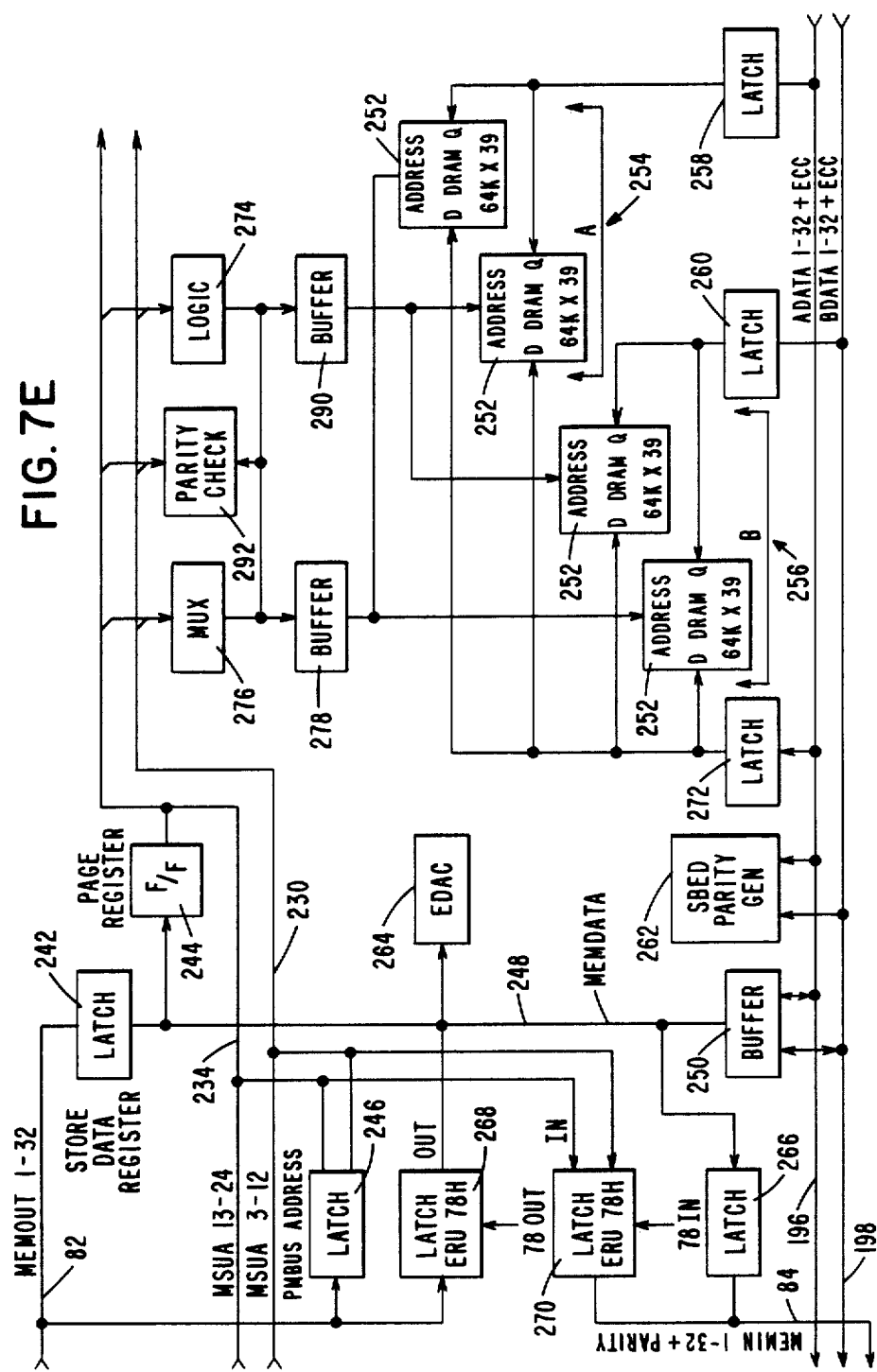

FIG. 7E is a block diagram of the main memory 28 of FIG. 1. Referring to FIGS. 5 and 6, when the main memory 28 is addressed using the page table real address of FIG. 5, the page table data of FIG. 6 is placed on the MEMDATA bus 248 by a buffer 250. A flip-flop 244 is connected to the MEMDATA bus 248, and is a page register for storing the page table data recovered from the page table in the main memory MSU as discussed. The page register 244 has its output connected to the MSUA bus 234 carrying bits 13-24 of the MSU address.

Latch 246 has its input connected to the MEMOUT bus 82 and its output connected to the MSUA buses 230 and 234 for providing a complete MSU address. Latch 246 is a PM address register which may be used to fetch data from the main memory 28 when the CPC 10 is being used in its conventional manner.

A memory data (MEMDATA) bus 248 is connected to the output of store data register 242. A buffer 250 has one input connected to the ADATA bus 196, and one input connected to the BDATA bus 198, with its output connected to the MEMDATA bus 248 as shown. The main memory 28 memory storage unit (MSU) includes a series of dynamic random access memories (DRAM) 252, a portion of which are shown in FIG. 7E. It will be understood that additional DRAMs may be provided as needed to supply sufficient memory to store the real memory as discussed in connection with FIG. 3.

The MSU is divided into an A portion 254 and a B portion 256. The DRAMs 252 of the A portion 254 are connected to the ADATA bus 196 through a latch 258. Similarly, the DRAMs 252 of the B portion 256 are connected to the BDATA bus 198 through latch 160.

A single bit error detection and parity generator circuit 262 is connected to both the ADATA bus 196 and the BDATA bus 198, and an error detection and correction circuit 264 is connected to the MEMDATA bus 248. The error detection and correction circuit 264 detects double bit errors and corrects single bit errors detected by the single bit error detection circuit 262. Error detection and correction circuits are known, and fall outside of the scope of the present invention, and thus will not be discussed.

A latch 266 has its input connected to the MEMDATA bus 248, and its output connected to the MEMIN bus 84. The latch 266 provides for data to be fetched from either the ADATA bus 196 or the BDATA bus 198 through the buffer 250 and placed on the MEMIN bus 84 when the CPC 10 is being used to fetch data from the main memory 28 in a conventional manner, and when the page table data is being fetched from the page table 58 as previously discussed. Latch 268 provides an ERU register 78(H), and is enabled by an appropriate signal from the ERU decode circuit 102 of FIG. 7A and an output command from the CPC 10 to send status inquiry signals from the CPC to the memory. Latch 270 provides an ERU register 78(H) which is enabled by appropriate signals from the ERU decode circuit 102 and an IN command from the CPC 10 to receive various status signals and error signals from the memory. Thus, latches 268 and 270 provide for direct communication between the CPC 10 and the memory for the transmission of status and error signals.

It will further be understood that store data register 242 connected to the MEMOUT bus 82 places data to be stored in the memory on the MEMDATA bus 248, which is in turn passed by the buffer 250 to the ADATA bus 196 to be stored in the appropriate DRAM 252 through latch 272. In this case, the PM address is latched in PM address bus 246 and placed on the MSU address buses 230 and 234. The data to be stored is latched in the store data register 242 and passed through the buffer 250 to the ADATA bus 196 to the latch 272 to be stored in the proper DRAM 252.

The logic circuit 274 provides the logic for accomplishing the storage and retrieving of data in the memory DRAMs 252. The multiplexer 276, in concert with the logic circuit 274 directs the MSU address from the MSUA buses 230 and 234 to the proper DRAMs 252 through buffers 278 and 290. In the illustrated embodiment, the DRAMs 252 are loaded 32 bits at a time. It will be understood that the logic circuit 274 addresses the proper DRAM 252, and enables the addressed DRAM to accept data in the latch 252 latched from ADATA bus 196 as described. The parity check circuit 292 provides conventional parity bit checking for the MSU addresses. The logic provided by the circuit 274 and the multiplexing functions of multiplexer 276 are well-understood in the art for storing and retrieving data from memory storage units, fall outside the scope of the present invention, and thus will not be discussed further.

When the CPC 10 issues a new virtual address on the ISUL bus 30 in response to a jump command, it means that the virtual address does not follow consecutively the address previously placed on the ISUL bus 30 and stored in the live register address register 126 of FIG. 7B. This means that the program has been directed to execute the instruction on a line other than the line immediately following the line of the previous instruction. Responsive to such a jump, the address on the ISUL bus 30 is used to fetch the target of the jump instruction, and then the value 4 is input to adder 128 over 129, and added to the address on the ISUL bus 30 to find the next address to be stored in the register 130.

Figure 9A:
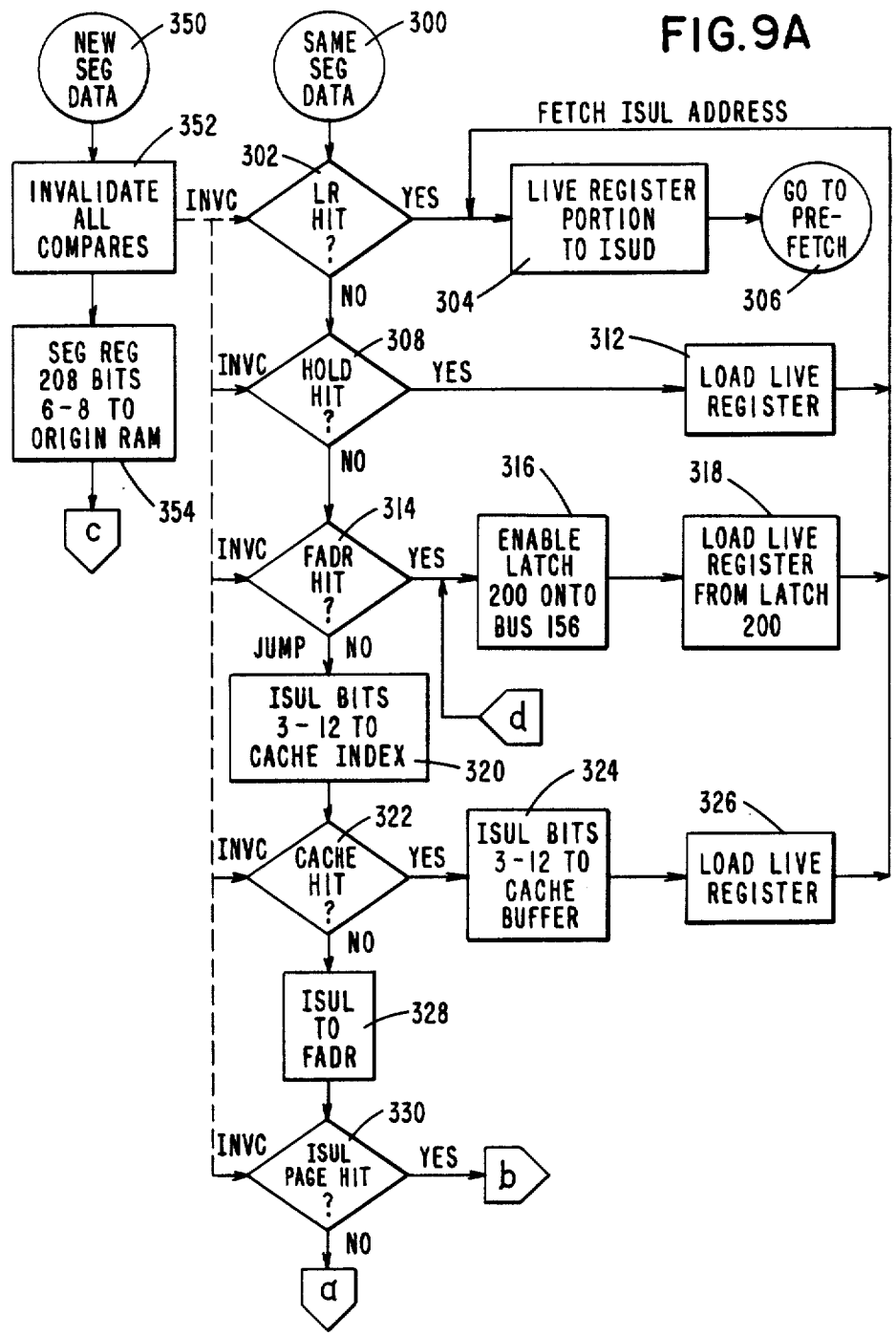
FIGS. 9A and 9B, joined at connectors a-d, is a logic flow diagram showing the logic flow of the system of FIG. 1 during the fetching of an instruction from a virtual ad,dress.
Figure 9B:
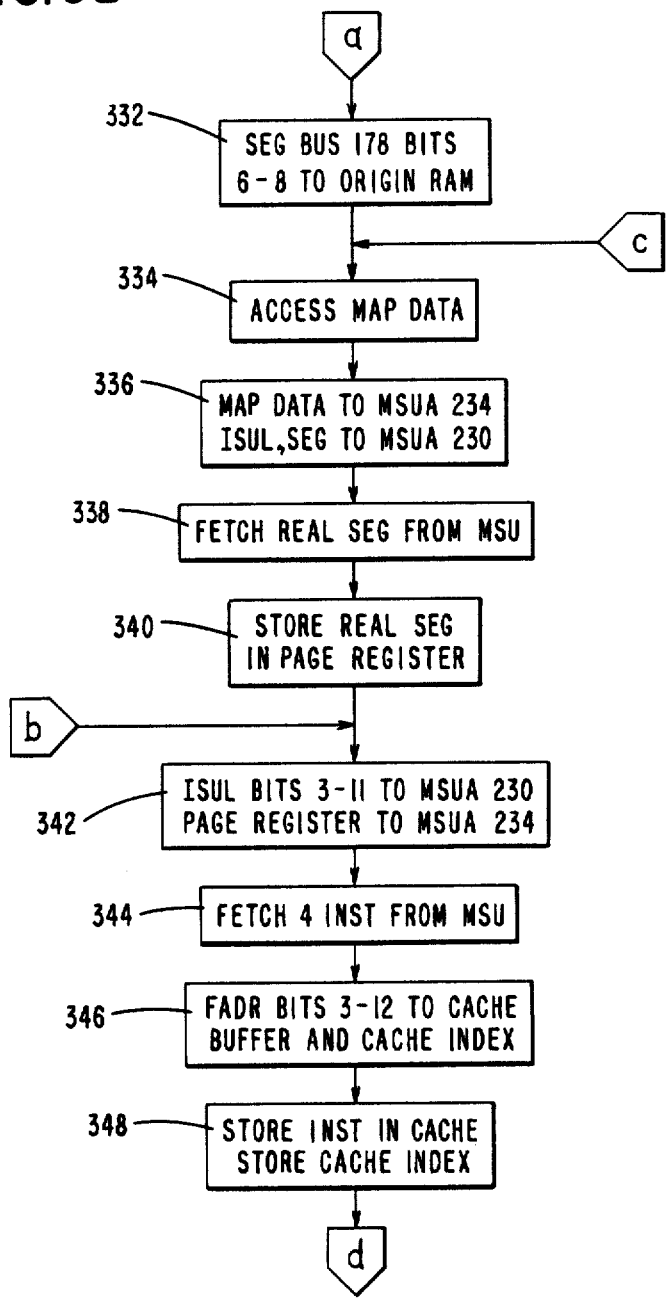

Turning now to FIGS. 9A and 9B, the fetching of an instruction from the main memory 28 at the address on the ISUL bus 30 will now be discussed.

FIGS. 9A and 9B is a logic flow diagram showing the logic flow of the system during the fetching of an instruction from a virtual address. The first case to be discussed is when the segment data, shown at FIG. 4 as bits 17-24 of the super segment virtual address, remains the same. This case is shown starting at 300 of FIG. 9A. If the segment data has not changed, the output 148 of the live register compare circuit 146 is checked at 302 to see if a live register hit has occurred. If a live register hit has occurred, the live register portion indicated by the least significant two bits on the ISUL bus 30 are passed at 304 to the ISUD bus 29. This condition indicates the address requested is within the four instructions stored in the live register. The system then goes at 306 to the prefetch function discussed in connection with FIG. 7B.

If a live register hit has not occured, the hold address compare circuit 134 is checked at 308 to see if a hold hit has occurred. If a hold hit has occurred in the cache buffer it means that the instruction requested is being held on the RAMDATA bus 156 by the prefetch logic. The cache buffer 157 is addressed by bits 3–12 on the HLDADR bus 133 by multiplexers 162 and 164. The four instructions in the cache buffer at that address are then loaded at 312 into the live register 154. The live register portion indicated by the first two bits of the ISUL bus 30 are then loaded at 304 onto the ISUD bus 29, and the hardware continues on with its prefetch functions.

If there is not a hold hit, the fetch address compare 142 is checked at 314 to see if a fetch address hit has occurred. If a fetch address hit has occurred, the instruction at the location on the FADR bus 340 has been fetched from the main memory 28 and is stored or in the process of being stored in the cache buffer 157 as discussed in connection with FIG. 7C. If the fetched instructions have arrived at latch 200, latch 200 is enabled at 316 to load the instructions onto RAM data bus 156 and into register 154 at 318. If not, the logic waits until the fetched instructions arrive at latch 200, and then the live register 154 is loaded therefrom. The logic then transfers to blocks 304 and 306 which are then executed as discussed.

If a fetch address hit has not occurred, the address is considered to be a jump address and bits 3–12 of the ISUL bus 30 are passed at 320 by multiplexer 170 to the cache index 165. The virtual segment data stored in the cache index is then compared at 322 to the present segment data on buses 184 and 186, and a determination is made if a cache index hit on bank 1 or bank 2 has occurred. If a cache index hit has occurred, bits 3–12 on the ISUL bus 30 is passed at 324 to the cache buffer 157, and the live register 154 is loaded with the 4 instructions at that location in the cache buffer. The logic then transfers to blocks 304 and 306 which are then executed as discussed. If a cache index hit has not occurred, the address on the ISUL bus 30 is passed at 328 by multiplexer 135 and loaded in the fetch address register 138, and placed on the FADR bus 140. Bits 12–16 of the ISUL bus 30 are then compared at 330 by the page boundary check circuit 236 to see if a page hit has occurred.

It will be understood that if a page hit has occurred, it will not be necessary to fetch the real address from the page table 58 in real memory. However, if the new address is outside of the page boundary, the page table data, as shown in FIG. 6, will have to be retrieved from the main memory.

If a page table hit has not occurred, bits 6–8 of the SEG bus 178 are passed by multiplexer 220 to the origin RAM 216 (332). The map data stored in the origin RAM at the origin RAM address contained in the segment register is then placed at 334 on the output of the origin RAM 216. The map data is accessed from the origin RAM 216, passed by the multiplexer 226, and placed on the MSUA bus 234 by the latch 232. Also, bits 12–16 on the ISUL bus 30 are passed by multiplexer 222 to latch 228, and bits 1–5 on the SEG bus 178 are passed by multiplexer 224 to the latch 228. The bits latched by latch 228 are placed on the MSUA bus 230 to form the page table real address shown in FIG. 5. These functions occur in FIG. 9B in block 336.

Figure 13A:
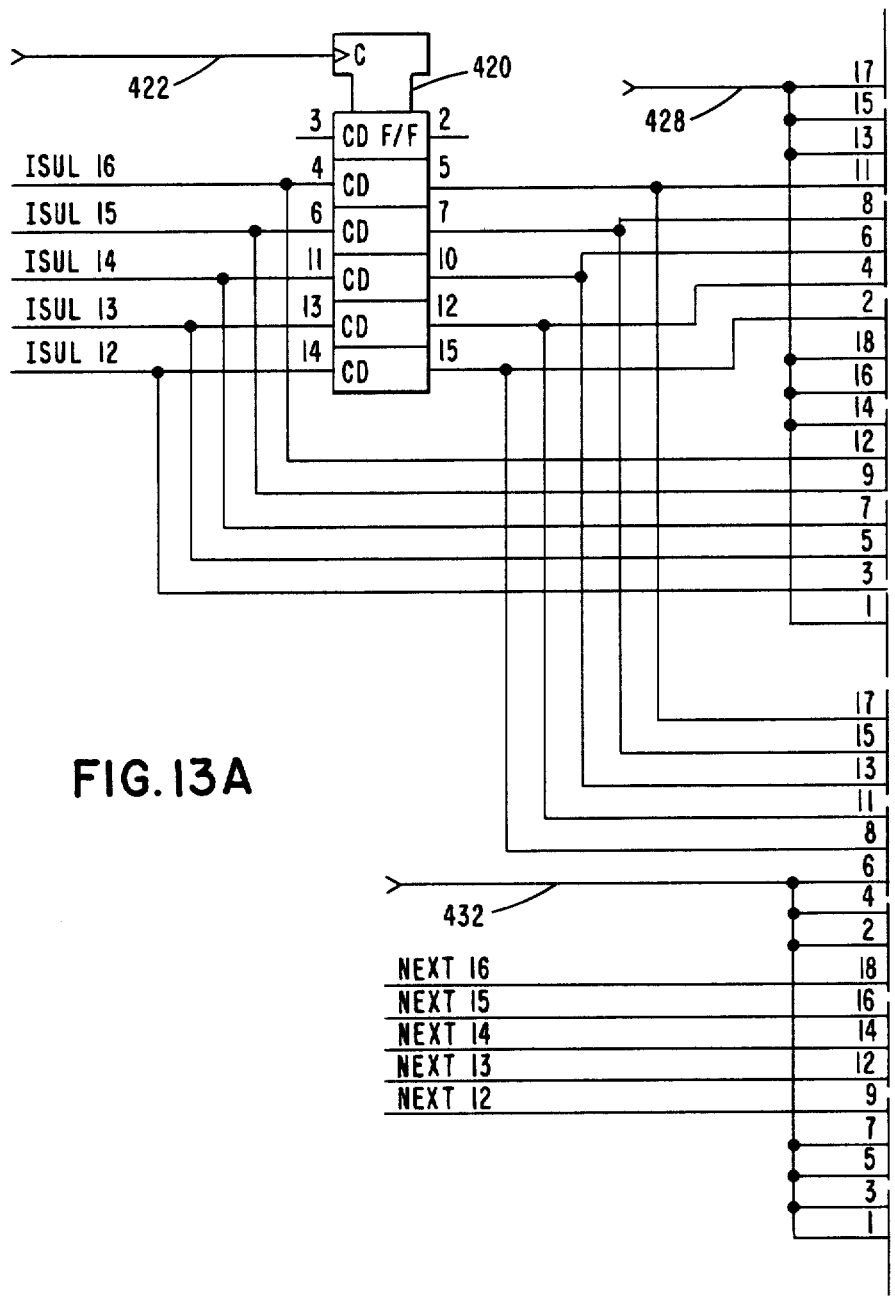
FIGS. 13A and 13B, arranged as shown in FIG. 14, is a schematic diagram of the page boundary check circuit of FIG. 7D.

Using the address from latches 228 and 232 as the MSU address, the page table data is fetched from the MSU (338), and, as discussed in connection with FIG. 7E, is placed at 340 in page register 244. At the same time the page boundary register 420 of FIG. 13A is loaded with the new virtual page number from the ISUL bus 30, to be discussed later. Bits 3–6 are passed by multiplexer 222 through its input 221 to the latch 228 to be placed on MSUA bus 230. Bit 3 is set to 0, and ISUL bits 3–6 are shifted such that they appear in MSUA bits 4–7. Multiplexer 224 then passes ISUL bits 7–11 to latch 228 where they are placed on the MSUA bus 230 as MSU address bits 8–12. The contents of latch 232 are then cleared such that the contents of page register 244 are placed on the MSUA bus 234 as MSU address bits 13–24. The contents of the MSU address, as indicated at block 342, then becomes the instruction real address shown in FIG. 6 for fetching four instructions from the main memory 28. In block 344, four instructions are fetched from the main memory 28, two from the A portion 254 over ADATA bus 196, and two instructions from the B portion 256 over BDATA bus 198.

It will be remembered that at block 328, the address on the ISUL bus 30 was placed on the FADR bus 140. Using bits 3–12 of the FADR bus 140 as addresses for the cache buffer, the four instructions placed on the raw data bus 156 by the latch 200 from the ADATA bus 196 and BDATA bus 198 are stored in one of the cache buffer RAMs 158 or 160. Bits 3–12 on the FADR bus 140 are also used as addresses to store the virtual segment data on SEG bus 178 and bits 13–16 of the FADR bus 140 in the corresponding RAM 166 or 168 of the cache index 165.

Returning to the page hit compare 330, if a page hit is found by the page boundary check circuit 236, the logic transfers to block 342 to fetch instructions from the main memory as indicated by the address in the page register 244 and on the ISUL bus 30.

If the address contains new segment data, the logic starts at 350 shown in FIG. 9A. If the segment data shown in FIG. 4 changes, new segment data is sent by the CPC 10 to the ERU register 70(H) identified as segment register 208 in FIG. 7D. When the ERU decode circuit 102 decodes the ERU address to a 70(H), an INVC signal is output on the output terminal 105 of the ERU decode circuit 102 as discussed in connection with FIG. 7A. As illustrated by the dotted line from block 352, all of the compares blocks 302, 308, 314, 322 and 330 receive this INVC signal to force all of the compares to a non-compare condition. This is shown in FIGS. 7B, 7C and 7D as inputting the INVC signal to the hold compare 134, the live register compare 146, the fetch address compare 142, the cache index compares 180 and 182, and the compare circuit in the page boundary check circuit 236.

Bits 6–8 of the segment register 208 are passed by the bus 211 and the multiplexer 220 to the origin RAM 216. Using bits 6–8 from the segment register 208 over bus 211 as an address for the origin RAM 216, the map data for the segment just received by the segment register 208 is accessed at 334 in the origin RAM 216. Since all of the compares are held in the non-compare condition by the INVC signal, the logic will then transfer to the fetch map data block 334 indicated by connector "C" in FIG. 9B.

At the same time, the four instructions retrieved from the memory 28 are stored in the cache buffer, the logic transfers to block 316 wherein the live register 154 is loaded from the latch 200, as previously discussed.

Figure 10:
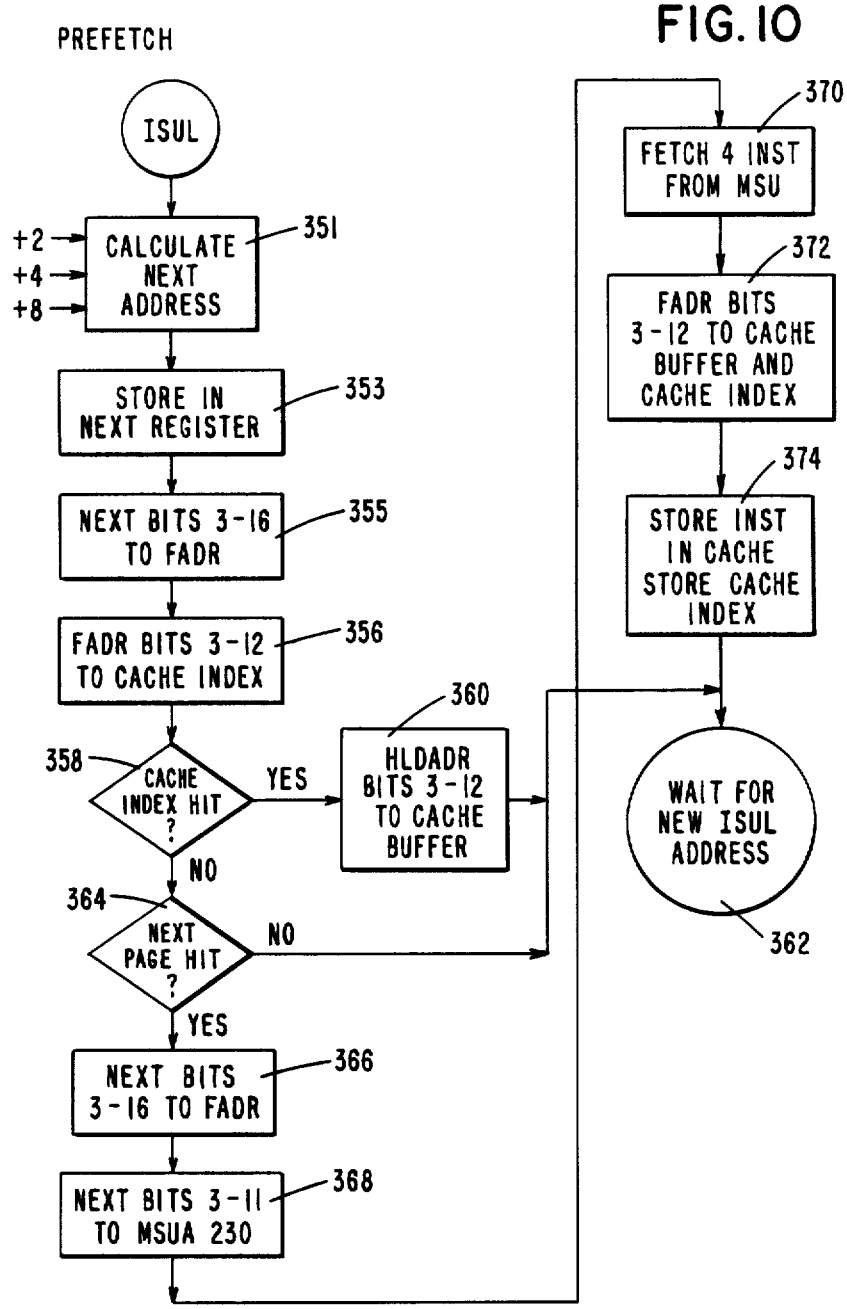
FIG. 10 is a logic flow diagram showing the logic of the circuit of FIG. 7B for performing prefetch operations.

FIG. 10 is a logic flow diagram showing the logic used by the circuit of FIG. 7B for performing prefetch operations. Either a 2, a 4 or an 8 is input on 121 to the adder 128 to be added to the address on the ISUL bus 30 to calculate at 351, the next address of the prefetch circuit of 7B. As discussed in connection with FIG. 7C, a 2 is added to the address for a PROM operation. If the last issued virtual address was a jump address as discussed in connection with check 314 of FIG. 9A, a 4 is added to the address on the ISUL bus 30 by adder 128. Otherwise, an 8 is added to the address on the ISUL bus 30 to calculate the next address.

It will be understood that when a jump address is issued, the operation of the hardware as discussed in connection with FIGS. 9A and 9B will fetch a block of four instructions including the instruction at the virtual address, and store them in the live register 154. The prefetch circuit of FIG. 7B will then prefetch the next four instructions in the expectation that the next address issued on the ISUL bus 30 will be within the consecutive block of 4 instructions just fetched. There is a high probability that the following ISUL address will still be in the live register 154. Thus, if 4 is added to the ISUL address, the next prefetch would calculate and prefetch an address in the 4 instruction block which was obtained in the previous prefetch sequence. For this reason, 8 is added to the ISUL address to calculate the next address for sequential addressing. This results in speeded up operation of the data processing system because the prefetch circuit of FIG. 7B remains far enough ahead of the addresses issued on the ISUL bus 30 such that the system is not waiting for instruction blocks to be loaded in the cache buffer.

The next address as calculated in accordance with the previous discussion, is loaded at 353 in the next address register 130 and NEXT bits 3-16 are passed at 355 to the fetch address register 138 through multiplexer 135. Referring to FIG. 7C, FADR bits 3-12 are passed at 356 to the cache index 165 through multiplexer 170 to check at 356 for a cache index hit.

If there is a cache index hit, the HLDADR bits 3-16 are latched at 360 into the cache buffer 157. This means that the instructions at the next succeeding address most likely requested on ISUL bus 30 is present in the cache buffer, and if requested, a hold hit will occur as discussed in connection with FIG. 9A.

After block 360, the logic goes to 362 to wait for a new address to appear on the ISUL bus 30.

Returning to the cache index hit check of 358, if a cache index hit has not occurred, a compare at 364 is made of the page boundary data on the NEXT bus 136 to see if a page hit has occurred. If a page hit has not occurred, it means that new page table data must be fetched from the page table portion 58 of the real memory 56 as discussed in connection with FIG. 3. Since the prefetch operation of the circuit of FIG. 7B is made in anticipation of what might be called next, there is a chance that if new page table data is fetched as discussed, it may not be used. Therefore, if no page hit has occurred, the logic goes to 362 to wait for a new ISUL address on the ISUL bus 30.

If a page table hit has occurred, the next bits 3-16 are passed at 366 from the next address register 130 through the multiplexer 135 to the fetch register 138 and placed on the FADR bus 140.

The NEXT bits 3-11 on the NEXT bus 136 are passed at 368 through multiplexers 222 and 224 to the MSUA bus 230. NEXT bits 3-6 are passed through multiplexer 222 and latched into latch 228 as MSU address bits 4-7. The MSU address bit 3 is turned off as shown in the instruction real address of FIG. 6. Next bits 7-11 are passed through multiplexer 224 to the latch 228 as MSU address bits 8-12. As discussed in connection with FIG. 7E, the MSU address bits 3-12 appear on MSUA bus 230, and the MSU address bits 13-24 are placed on MSUA bus 234 by the page register 244. Thus, the total address appearing on MSUA buses 230 and 234 are used at 370 by the memory portion A, 254 and memory portion B, 256 of FIG. 7E to fetch four instructions starting at the MSU address.

As discussed in connection with FIG. 7C, the four fetched instructions are placed on the RAM data bus 156. The fetch address bits 3-12 on the FADR bus 140 are passed at 372 to the cache buffer and the cache index as addresses, and the instructions are stored at 374 in the cache buffer 157 and the cache index data is stored in the cache index 165. The logic then goes to block 362 wherein the circuit of 7B waits for a new ISUL address to appear on the ISUL bus 30.

Figure 11A:
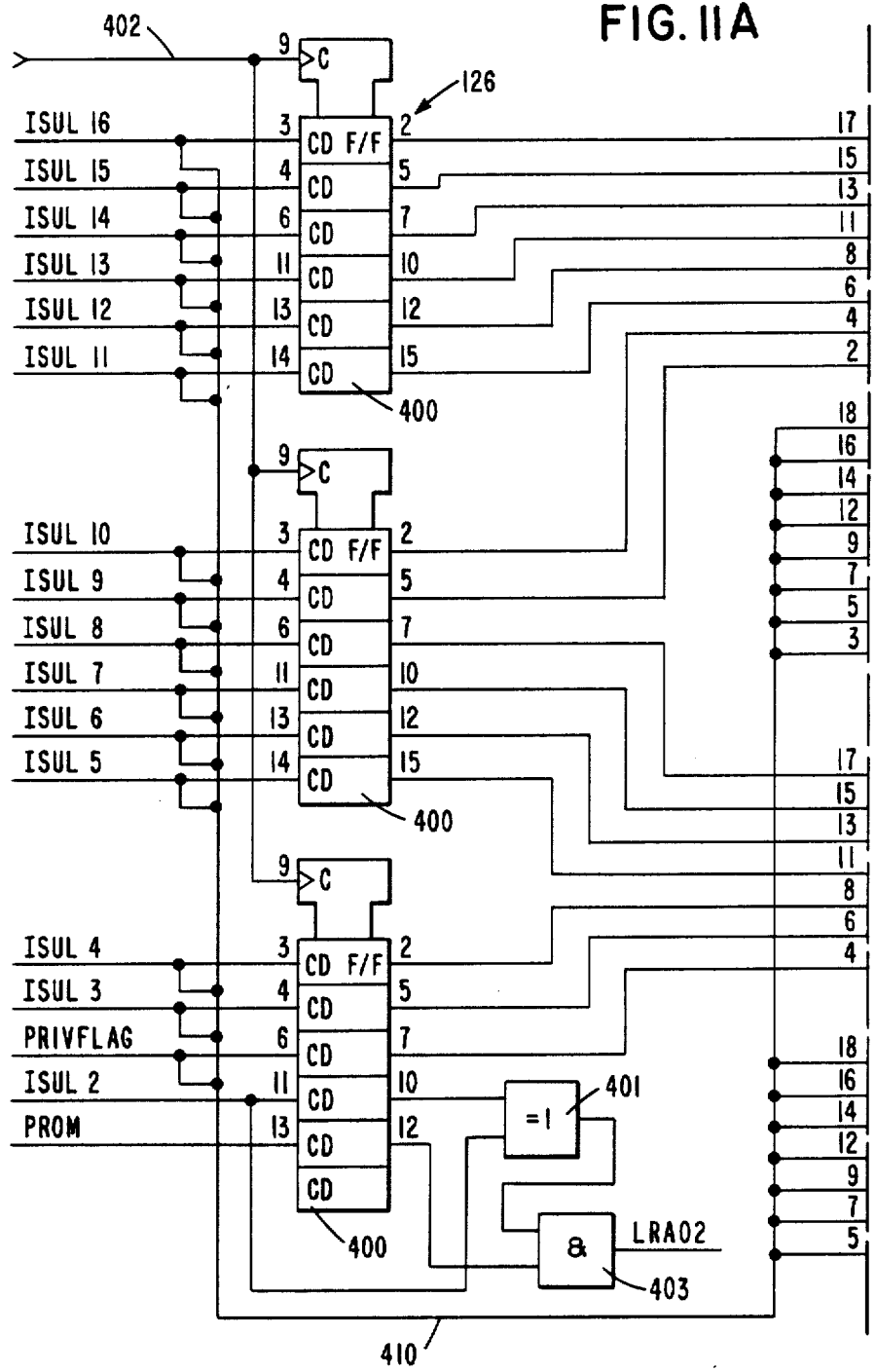
FIGS. 11A and 11B, arranged as shown in FIG. 12, is a schematic diagram of the live register of the circuit of FIG. 7C.
Figure 11B:
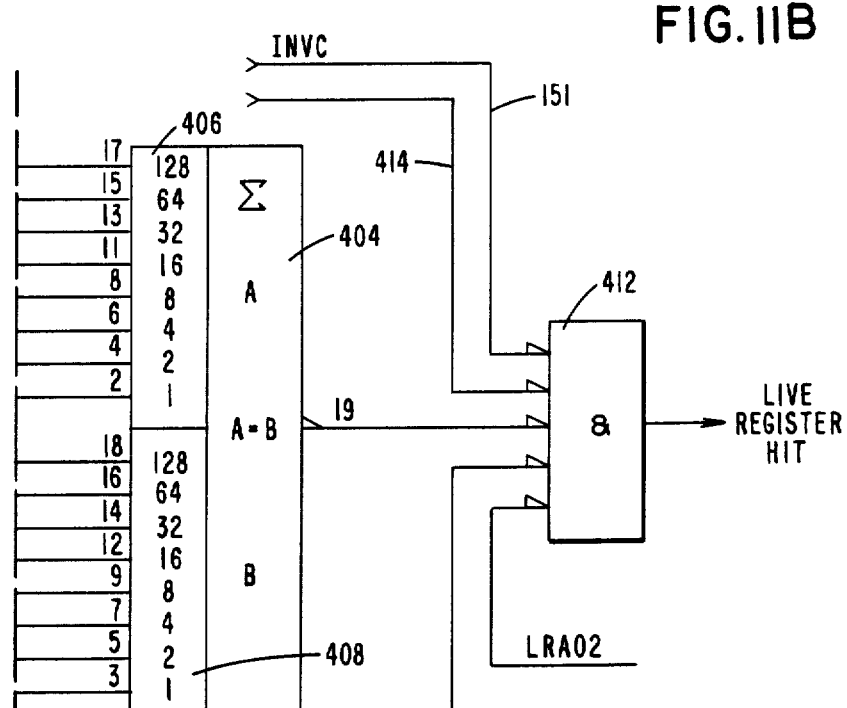
Figure 12:
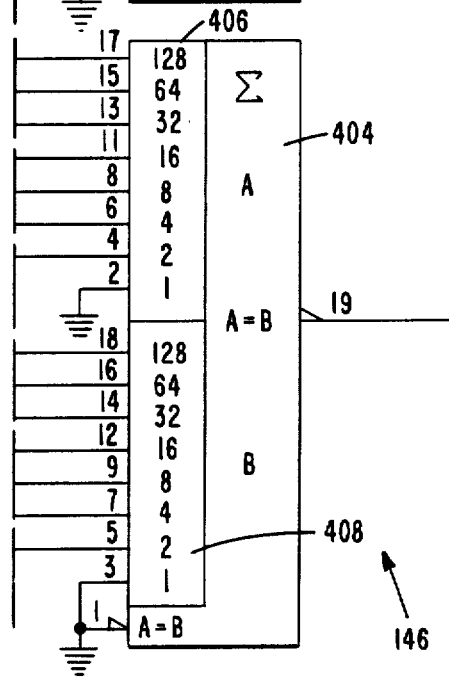
Figure 12:
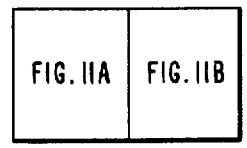

FIGS. 11A and 11B, arranged as shown in FIG. 12, is a schematic diagram of the live register address register 126 and the live register compare circuit 146. The live register address register 126 includes a series of multi-flip-flop chips 400 which may be 74F174 CD type flip-flops connected as shown. A control line 402 is connected to the clock pin 9 of each of the flip-flops 400, and is enabled when bits 2-16 on the ISUL bus 30 are to be stored in the register 126.

The compare circuit 146 of FIG. 7B includes comparator chips 404 of FIG. 11B, each having an A portion 406 and a B portion 408. The output pins of the flip-flops 400 of the register 126 of FIG. 7B are connected to the A input side of the chips 404, as shown in FIG. 11B. The ISUL bits are connected to a bus 410 and passed around the register 126 and connected to the B portion 408 of the chips 404 as shown. The comparator chips 404 may be chips 74F521. Chips 404 add the value of the bits in their respective A and B portions, and compare the sums at their output, pin 19. If the sum on A is equal to the sum on B, the output on pin 19 is low, and if the sum of A is not equal to the sum of B, the output on pin 19 is high. The outputs of the chips 404 are then input into a NAND gate 412 with the INVC signal on input lead 151 and an input lead 414, as shown in FIG. 11B. When a live register check is made at 302 as discussed in connection with FIG. 9A, a low is placed on input lead 414, and if the outputs of the 404 chips are low and the INVC signal on lead 151 is low, a live register hit is indicated by a low on the output of NAND gate 412. If the live register compare is to be disabled, a high is placed on the INVC input lead 151 of the NAND gate 412, causing the output of NAND gate 412 to go high forcing the compare circuit 146 to indicate a live register miss. The NAND gate 412 may be a 74F64 chip connected to form the NAND gate described.

When PROM routines are being executed, two consecutive addresses are stored in the live register 154. In this case, bits 2-16 of the virtual address on ISUL bus 30 are compared with the address stored in live register address register 126 to determine if the requested instruction is already in the live register 154. In FIG. 11A, ISUL2 bit signal from the ISUL bus 30 is compared with the ISUL2 bit signal stored in the live register address register 126 by an exclusive OR gate 401. The output of exclusive OR gate 401 is input into an AND gate 403, along with a PROM signal, also from the live register address register 126. The PROM signal input into live register address register 126 is high whenever a PROM routine is being executed by the CPC 10. The live register 02 bit signal (LRA02) outputted from AND gate 403 of FIG. 11A is input into NAND gate 412 as shown.

It will thus be understood, that when the PROM signal is high, indicating a PROM routine is being executed, the LRA02 signal will be high or low, depending on the output of the exclusive OR gate 401. When the PROM signal is low, indicating a PROM routine is not being executed, the LRA02 signal will be low regardless of the output of exclusive OR gate 401. The output of exclusive OR gate 401 will only be low when the ISUL2 bit on ISUL bus 30 is the same as the ISUL2 bit stored in the live register address register 126. Thus, when the PROM signal is a high, the ISUL2 bit will be included in the live register hit comparison made by the comparator 146, and when the PROM signal is low, the live register hit comparison will only include ISUL bits 3–16.

A privileged operation flag signal (PRIVFLAG) is also input into live register address register 126 as shown in FIG. 11A, and compared as shown in FIG. 11B to indicate when a privileged operation is being performed. The PRIVFLAG signal is raised to a high during the privileged mode operation by the CPC 10. When the PRIVFLAG signal changes, the output of NAND gate 412 goes high, indicating a live register miss, whereupon the address on the ISUL bus 30 is further processed as previously described. This insures that privileged instructions are not mixed with other instructions fetched by the system.

Figure 13B:
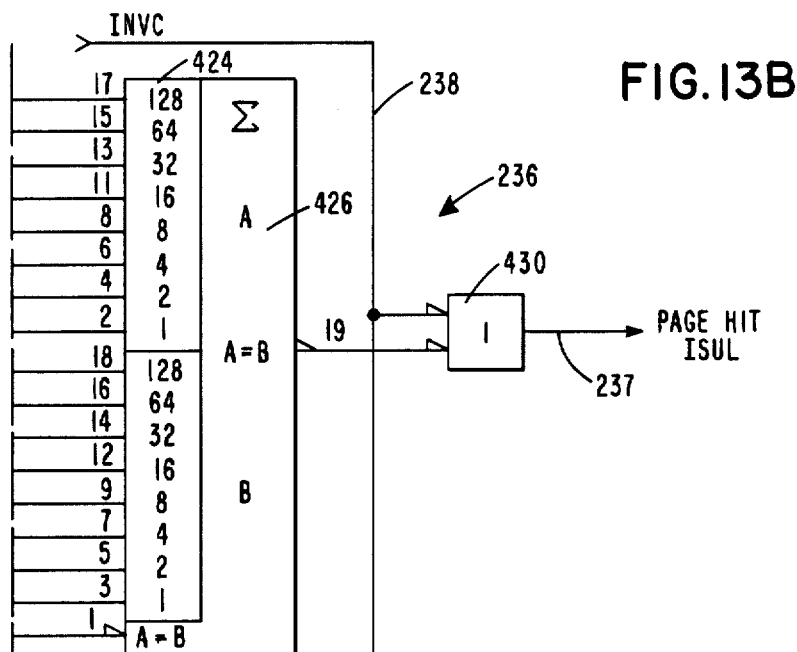
Figure 14:
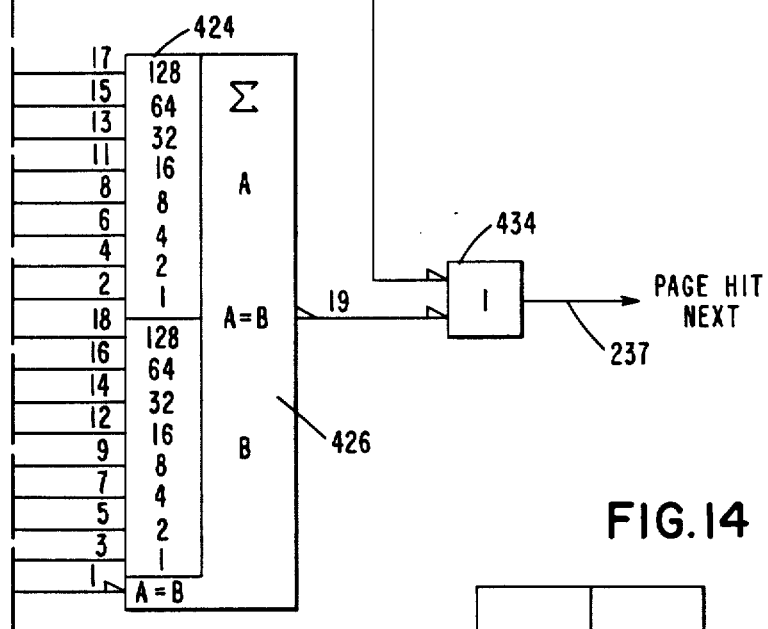
Figure 14:
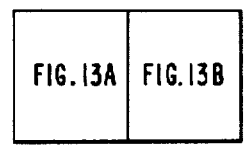

FIGS. 13A and 13B, arranged as shown in FIG. 14, is a schematic diagram showing the page boundary check circuit 236 of FIG. 7D. The circuit 236 includes a page boundary register 420 which is a multi-flip-flop chip 74F174. An input lead 422 is connected to the clock input of the flip-flop 420 for controlling the input of data into the flip-flop 420 when a new address appears on the ISUL bus 30.

Circuit 236 includes a comparator chip 424 for comparing the page boundary data of the present ISUL page boundary data with the page boundary data of the previous address on the ISUL bus 30. A second comparator chip 426 is included for comparing the page boundary data of the address on the next bus 136 with the page boundary data stored in the register data of flip-flop 420.

When a page hit is to be checked on the address on the ISUL bus 30 at check 330 of FIG. 9A, control lead 428 of the comparator chip 424 is grounded enabling the comparison of the page boundary data on the ISUL bus with the page boundary data stored in the register 420. If there is an equal compare, the output pin 19 of the 424 chip goes low. If the INVC signal on control lead 238 is also low, the output of NAND gate 430 goes low, indicating a page hit has been made for the ISUL address check.

If a page hit check is to be made on the address on the NEXT bus at check 364 of FIG. 10, the control lead 432 of the comparator chip 426 is grounded, enabling the comparator chip 426 to compare the page boundary data on the NEXT bus with the page boundary data stored in register 420. If the comparison is equal, the output pin 19 of the chip 426 goes low. If the INVC signal on lead 238 is also low, the output of NAND gate 434 goes low indicating that the check at 364 has produced a page hit.

Chips 424 and 426 are comparator chips 74F521.

Flip-flops indicated in FIGS. 7A–7E may be chips 74F174, whereas latches may be latch chips rather than flip-flop chips. The flip-flop chips are chosen where indicated because of their edge triggered characteristic.

A data processing circuit has been described which allows directly executable microinstructions to be stored in main memory, and to be fetched from anywhere in main memory using a combination of hardware and software. A live register and cache scheme is disclosed which allows instructions to be prefetched from the memory before the data processing system needs the instructions to provide for operating the data processing system in a more efficient manner. The data processing system described includes hardware for using 25 bits which addresses 32 megabytes of memory, and for using a page table in memory for converting the virtual memory of $2^{32}$ bytes to a real memory of $2^{24}$. The hardware disclosed includes a bypass which may be used to directly address $2^{17}$ bytes of real memory without using a page table scheme. The described data processing system and its components are exemplary only and may be replaced by equivalents by those skilled in the art, which equivalents are intended to be covered by the attached claims.

What is claimed is:

1. A data processing system comprising:
a main memory for storing therein data and microinstructions;
a central processing chip having a data terminal and an instruction terminal;
processor memory bus means connected between said main memory and said central processing chip data terminal for the transmission of data address bits and data therebetween;
instruction bus means connected between said central processing chip instruction terminal and said main memory for the transmission of instructions address bits and instructions therebetween;
instruction address means connected between said processor memory bus means, said instruction bus means and said processor memory bus means, said instruction address means for receiving from said central processing chip, said data address bits as a first portion of a fetching address and said instruction address bits as a second portion of said fetching address, and responsive to said fetching address, fetching from said main memory, said addressed microinstruction stored therein; and
transmitting means for transmitting said fetched addressed microinstruction over said instruction bus means to said central processing chip for direct execution by said central processing chip.

2. The data processing system of claim 1 wherein said transmitting means comprises live register means connected between said main memory and said instruction bus means for storing a plurality of microinstructions fetched from said main memory, and live register hit means for determining from said second address portion, the presence of said addressed microinstruction in said live register means.

3. The data processing system of claim 2, wherein said transmitting means further comprises cache means connected between said main memory and said instruction address means for storing a plurality of microinstructions fetched from said main memory and their addresses, and cache hit means connected to said cache means for determining from said stored addresses, the presence of said addressed microinstruction in said cache means.

4. The data processing system of claim 1 wherein said instruction address means comprises:
combining means connected to said instruction bus means and said processor memory bus means for combining said first and second fetching address portions for forming a virtual address; and
translation means connected to said combining means for translating said virtual address to a fetching address for fetching said addressed microinstruction from said main memory.

5. The data processing system of claim 4 wherein said instruction address means further comprises prefetch means connected to said instruction bus means for determining a next address following the fetching address of said addressed microinstruction, and first comparison means in said transmitting means and connected to said live register means and said cache means for determining if the microinstruction corresponding to said next address is stored in one of said live register means or said cache means.

6. The data processing system of claim 5 wherein said prefetch means comprises means connected to said main memory for fetching from said main memory, the microinstruction corresponding to said next address in the event said microinstruction corresponding to said next address is not stored in one of said live register means or said cache means.

7. The data processing system of claim 5 wherein said translation means comprises random access memory means for storing map data, said random access memory means being connected to said instruction address means and addressable by selected bits of one of said virtual address portions, means connected to said instruction address means and said random access memory means for combining said map data with selected bits of said virtual address portions for giving a page table real address, and fetching means connected between said translation means and said main memory for fetching, responsive to said page table real address and other selected bits of said virtual address portions, a second real address portion of a fetching address which has been previously stored in a selected portion of said main memory.

8. The data processing system of claim 7 wherein said fetching means comprises page boundary check means connected to said instruction address means and said instruction bus means for determining if said second real address portion has previously been fetched from said selected portion of said main memory.

9. The data processing system of claim 7 wherein said fetching means comprises page register means connected to said main memory for storing said second real address portion fetched from said main memory responsive to said page table real address.

10. The data processing system of claim 9 wherein said fetching means comprises selecting means connected to said combining means, said random access means, said prefetch means, and said page register, said selecting means selecting the fetching address by which said fetching means fetches microinstructions from said main memory such that said fetching address is formed from one of:

a. the instruction address bits from said instruction bus means when an instruction is to be fetched from said main memory without address translation;
b. the instruction address bits from said instruction bus means and the data address bits from said processor memory bus means when said map data is to be fetched from said main memory;
c. selected ones of the instruction address bits from said instruction bus means, selected ones of the data address bits from said processor memory bus means and map data from said random access means when said page table real address is to be fetched from said main memory;
d. selected ones of said instruction address bits from said selected ones of said instruction address bits from said instruction bus means and the contents of said page register means when an instruction corresponding to a translated address is to be fetched from said main memory; and
e. said next address of said prefetch means and the contents of said page register means when an instruction corresponding to said next address is to be fetched from said main memory.

11. In a data processing system having a central processing chip, a processor memory bus connected to said central processing chip for sending data to and fetching data from a memory, and an instruction storage unit bus connected to said central processing chip for fetching instructions from an instruction storage memory, an apparatus for fetching directly executable microinstructions comprising:
a main memory for storing data and microinstructions; and
an instruction address means connected to said processor memory bus, said instruction storage unit bus and said main memory, for fetching executable microinstructions from said main memory, said instruction address means comprising;
virtual address register means for receiving a first portion of a virtual address over said instruction storage unit bus from said central processing chip and a second portion of said virtual address over said processor memory bus from said central processing chip; and
virtual-to-real translation means for translating the virtual address portions in said virtual address register means to a real address in said main memory from which an executable microinstruction may be fetched.

12. The data processing system of claim 11 wherein said instruction storage means includes live register means connected between said instruction storage bus means and said main memory for storing a plurality of microinstructions fetched from said main memory, and wherein said virtual address register means includes live register hit means connected to said instruction storage unit bus for determining from said first portion, the presence of said addressed microinstruction in said live register means, thereby alleviating the fetching from main memory of said addressed microinstruction which is stored in said live register means.

13. The data processing system of claim 12 wherein said instruction storage means further comprises cache means connected to said main memory for storing a plurality of microinstructions fetched from said main memory and their addresses, and cache hit means connected to said cache means for determining from said stored addresses, the presence of said addressed microinstruction in said cache means, thereby alleviating the fetching from main memory of said addresssed microinstruction which is stored in said cache means.

14. The data processing system of claim 11 wherein said virtual-to-real translating means includes means connected to said virtual address register means for translating selected parts of said virtual address portions in said virtual address register means to a real address portion which, when combined with other selected parts of said virtual address portions in said virtual address register means, gives a fetching address usable to fetch said addressed microinstruction from said main memory.

15. The data processing system of claim 14 wherein said instruction address means comprises prefetch means connected to said virtual address register means for determining a next address following the address of said addressed microinstruction, and means connected to said prefetch means for determining if the microinstruction corresponding to said next address is stored in one of said live register means or said cache means.

16. The data processing system of claim 15 wherein said prefetch means comprises means connected to said main memory for fetching from said main memory, the microinstruction corresponding to said next instruction in he event said microinstruction corresponding to said next nstruction is not stored in one of said live register eans or said cache means.

17. The data processing system of claim 15 wherein said virtual-to-real translation means comprises random access memory means for storing map data, said random access memory means connected to said virtual address register means and addressable by selected parts of one of said virtual address portions in said virtual address register means, combining means connected between said random access memory means and said virtual address register means for combining said map data with selected parts of said virtual address portions in said virtual address register means for giving a page table real address, and fetching means connected between said combining means and said main memory for fetching responsive to said page table real address and other selected parts of said virtual address portions, said real address portion of said fetching address which has been previously stored in a selected portion of said main memory.

18. The data processing system of claim 17 wherein said fetching means comprises means connected to said combining means for determining if the real address portion of said fetching address has been fetched from said selected portion of said main memory, thereby alleviating the fetching from main memory of said real address portion.

19. The data processing system of claim 17 wherein said fetching means comprises page register means connected to said main memory for storing said real address portion fetched from a selected portion of said main memory responsive to said page table real address.

20. The data processing system of claim 19 wherein said fetching means comprises selecting means connected to said processor memory bus means, said instruction storage bus unit means, said random access means, said prefetch means, and said page register, said selecting means selecting the fetching address by which said fetching means fetches microinstructions from said main memory such that said fetching address is formed from one of:

a. the first portion from said instruction storage unit bus means when an instruction is to be fetched from said main memory without address translation;
b. the first portion from said instruction storage unit bus means and the second portion from said processor memory bus means when said map data is to be fetched from said main memory;
c. selected parts of said first portion from said instruction storage unit bus means, selected parts of said second portion from said processor memory bus means and map data from said random access memory means when said page table real address is to be fetched from said main memory;
d. selected parts of said first portion from said instruction storage unit bus means and the contents of said page register means when an instruction corresponding to a translated address is to be fetched from said main memory; and
e. said next address of said prefetch means and the contents of said page register means when an instruction corresponding to said next address is to be fetched from said main memory.

21. In a data processing system having a central processing chip, a processor memory bus connected to said central processing chip for sending data to and fetching data from a memory, and an instruction storage unit bus connected to said central processing chip for fetching instructions from an instruction storage memory, a method for fetching directly executable microinstructions comprising the steps of:

a. storing in a main memory, data and microinstructions;
b. receiving in a virtual address register means, a first portion of a virtual address over said instruction storage unit bus from said central processing chip;
c. receiving in the virtual address register means, a second portion of said virtual address over said processor memory bus from said central processing chip;
d. translating the virtual address portions in said virtual address register means to a real address in said main memory; and
e. fetching from said main memory, an executable microinstruction using said real address.

22. The method of claim 21 further comprising the additional steps of:

f. storing in a live register means, a plurality of microinstructions fetched from said main memory, and
g. determining from one of said virtual address portions, the presence of said addressed microinstruction in said live register means, thereby alleviating the fetching from main memory of said addressed microinstruction which is stored in said live register means.

23. The method of claim 22 further comprising the additional steps of:

h. storing in a cache means, a plurality of microinstructions fetched from said main memory and their addresses, and
i. determining from said stored addresses, the presence or absence of said addressed microinstruction in said cache means.

24. The data processing system of claim 21 wherein step d. includes:

d1. translating selected parts of said virtual address portions in said virtual address register means to a real address portion, and d2. combining said real address portion with other selected parts of said virtual address portions in said virtual address register means for giving a fetching address usable to fetch said addressed microinstruction from said main memory.

25. The method of claim 24 further comprising the additional steps of:
   d3. determining a next address following the address of said addressed microinstruction, and
   d4. determining if the microinstruction corresponding to said next address is stored in one of said live register means or said cache means.

26. The method of claim 25 further comprising the additional steps of:
   d5. fetching from said main memory, the microinstruction corresponding to said next instruction when said microinstruction corresponding to said next instruction is not stored in one of said live register means or said cache means.

27. The method of claim 25 comprising the additional steps of:
   d5. addressing a random access memory means using selected parts of one of said virtual address portions in said virtual address register means for storing map data,
   d6. combining said map data with selected parts of said virtual address portions in said virtual address register means for giving a page table real address, and
   d7. fetching responsive to said page table real address and other selected parts of said virtual address portions, said real address portion of said fetching address which has been previously stored in a selected portion of said main memory.

28. The method of claim 27 comprising the additional steps of:
   d8. determining if the real address portion of said fetching address has been fetched from said selected portion of said main memory.

29. The method of claim 27 comprising the additional steps of:
   d8. storing in a page register means, said real address portion fetched from a selected portion of said main memory responsive to said page table real address.

30. The method of claim 29 comprising the additional steps of:
   d9. selecting the fetching address for step e. such that said fetching address is formed from one of:
   i. the first portion from said instruction storage unit bus means when an instruction is to be fetched from said main memory without address translation;
   ii. the first portion from said instruction storage unit bus means and the second portion from said processor memory bus means when said map data is to be fetched from said main memory;
   iii. selected parts of said first portion from said instruction storage unit bus means, selected parts of said second portion from said processor memory bus means and map data from said random access memory means when said page table real address is to be fetched from said main memory;
   iv. selected parts of said first portion from said instruction storage unit bus means and the contents of said page register means when an instruction corresponding to a translated address is to be fetched; and
   v. said next address from said prefetch means and the contents of said page register means when an instruction corresponding to said next address is to be fetched from said main memory.

31. A data processing system comprising:
   a main memory for storing therein data and microinstructions;
   a central processing chip having a multi-bit data terminal and a multi-bit instruction terminal;
   a multi-bit processor memory bus connected between said main memory and the data terminal of said central processing chip;
   a multi-bit instruction bus connected to the instruction terminal of said central processing chip;
   an instruction map circuit having a first virtual address portion input connected to said instruction bus, a second virtual address portion input connected to said processor memory bus, and an output connected to said main memory, said instruction map circuit including means for translating virtual address portions on its inputs to a real address on its output for fetching microinstructions from said main memory; and
   an instruction cache circuit having an input connected to said main memory and an output connected to said instruction bus, said instruction cache circuit including live register means for receiving and storing a plurality of microinstructions from said main memory responsive to said real address, and means for outputting responsive to the virtual address portion on one of its inputs, one of said microinstructions on its output terminal for transmission over said instruction bus to said central processing chip for direct execution.

32. The data processing system of claim 31 wherein said live register means includes a tristate device having an input connected to said input terminal of said instruction cache circuit for receiving a plurality of microinstructions simultaneously from said main memory, said tristate device having a control terminal connected to selected low order bits of said instruction bus, and an output connected to said instruction bus, the output of said tristate device having a plurality of states controlled by said selected low order bits from said central processing chip for determining which one of the microinstructions stored in said live register means is placed on said instruction bus for transmission to said central processign chip.

33. The data processing system of claim 32 wherein said instruction map circuit includes:
   a first address register for holding a virtual address portion on said instruction bus, said first address register having a multi-bit input connected to the instruction bus and a multi-bit output for outputting the virtual address portion held by said first address register means;
   a compare circuit having a first input connected to said instruction bus, a second input connected to the output of said holding means, and an output having a first state when selected bits of the address portions on its first and second inputs are the same indicating that the microinstruction corresponding to the virtual address portion on said instruction bus is present in said live register means, and a second state when selected bits of the virtual address portions on its first and second inputs are not the same indicating that the microinstruction corresponding to the virtual address portion on said instruction bus is not present in said live register means; and means for causing the transmission of the contents of said live register means determined by said selected low order bits to said central processing chip when said compare circuit output is in its first state, and for causing a microinstruction to be fetched from one of said main memory and said instruction cache when said compare circuit output is in its second state.

34. The data processing system of claim 32 wherein said instruction map circuit includes:

a second address register for holding a virtual address portion on said processor bus, said second address register having a multi bit input connected to said processor memory bus and a multi-bit output;

a random access memory device having an address terminal for addressing locations in said random access memory device and a multi-bit output for outputting the contents of said random access memory device addressed by said address terminal, said address terminal being connected to selected bits of the multi-bit output of said second address register; and multiplexer means for passing a fetching address to said main memory, said multiplexer means having a first set of inputs connected to the multi-bit output of said random access memory device, selected bits of the instruction bus and selected bits of the multi-bit output of the second address register; a multi-bit output; and a control terminal for passing bits on the multiplexer means first set of inputs to the multiplexer means output for fetching a real address portion from said main memory.

35. The data processing system of claim 34 wherein said instruction map circuit further includes a page register for storing said real address portion fetched from said main memory.

36. The data processing system of claim 35 wherein;

said multiplexer means has a second set of inputs connected to selected bits of said instruction bus;

said page register includes an output means connected to said main memory for presenting the contents of said page register as a portion of a fetching address to said main memory; and said instruction map circuit includes means for placing bits on the control terminal of said multiplexer for passing bits on the second set of inputs of said multiplexer means to the multiplexer means output which, along with the contents of said page register, presents a fetching address to said main memory.

37. The data processing system of claim 36 wherein said instruction map circuit includes:

a page boundary register for holding selected bits of the virtual address portion on said instruction bus, said page boundary register having an input connected to said instruction bus and an output on which the held bits are placed;

a page boundary comparison means having a first input connected to the output of said page boundary register, a second input connected to said instruction bus, and an output having a first state when selected bits of the virtual address portion on said instruction bus are the same as the contents of said page boundary register, and a second state when selected bits of the virtual address portion on said instruction bus are not the same as the contents of said page boundary register; and means causing the contents of said page register and said second set of inputs of said multiplexer to be used as a fetching address to fetch microinstructions from said main memory when the output of said page boundary comparison means is in its first state, and for causing said first set of inputs of said multiplexer to be used as a fetching address to fetch a real address portion from said main memory when the output of said page boundary comparison means is in its second state.

* * * * *

UNITED STATES PATENT AND TRADEMARK OFFICE
CERTIFICATE OF CORRECTION

PATENT NO. : 4,747,044

DATED : May 24, 1988

INVENTOR(S) : Carson T. Schmidt et al.

It is certified that error appears in the above-identified patent and that said Letters Patent is hereby corrected as shown below:

Column 24, line 16, after the word "said" (first occurrence), delete "selected ones of said instruction address bits from said".

Signed and Sealed this

Third Day of January, 1989

Attest:

DONALD J. QUIGG

Attesting Officer

Commissioner of Patents and Trademarks